(12) United States Patent
Kwon et al.

(10) Patent No.: US 11,397,481 B2
(45) Date of Patent: Jul. 26, 2022

(54) METHOD FOR PROCESSING INPUT MADE WITH STYLUS PEN AND ELECTRONIC DEVICE THEREFOR

(71) Applicant: Samsung Electronics Co., Ltd., Gyeonggi-do (KR)

(72) Inventors: Banghyun Kwon, Gyeonggi-do (KR); Inhyung Jung, Gyeonggi-do (KR); Eunyoung Chang, Gyeonggi-do (KR); Hyunwoong Kwon, Gyeonggi-do (KR); Jongwu Baek, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/264,438

(22) PCT Filed: May 22, 2019

(86) PCT No.: PCT/KR2019/006102
§ 371 (c)(1),
(2) Date: Jan. 29, 2021

(87) PCT Pub. No.: WO2020/027412
PCT Pub. Date: Feb. 6, 2020

(65) Prior Publication Data
US 2021/0311563 A1 Oct. 7, 2021

(30) Foreign Application Priority Data
Jul. 31, 2018 (KR) .......................... 10-2018-0089090

(51) Int. Cl.
*G06F 3/038* (2013.01)
*G06F 3/0354* (2013.01)
(Continued)

(52) U.S. Cl.
CPC .......... *G06F 3/038* (2013.01); *G06F 3/03545* (2013.01); *G06F 3/0416* (2013.01); *G06F 3/04883* (2013.01); *G06F 2203/0384* (2013.01)

(58) Field of Classification Search
None
See application file for complete search history.

(56) References Cited

U.S. PATENT DOCUMENTS

| 10,228,779 B2 | 3/2019 | Seo et al. | |
| 2011/0007037 A1* | 1/2011 | Ogawa | G06F 3/045 345/179 |

(Continued)

FOREIGN PATENT DOCUMENTS

| EP | 0 098 117 | 1/1984 |
| GB | 2445615 | 7/2008 |

(Continued)

OTHER PUBLICATIONS

PCT/ISA/210 Search Report issued on PCT/KR2019/006102, dated Sep. 5, 2019, pp. 5.

(Continued)

*Primary Examiner* — Stephen T. Reed
(74) *Attorney, Agent, or Firm* — The Farrell Law Firm, P.C.

(57) ABSTRACT

The present invention relates to a method for processing an input using a stylus pen and an electronic device thereof. The electronic device may include a housing including an inner space and a hole connected to the inner space, a touch screen display including a first stylus pen which is insertable into the inner space through the hole and has an external surface including a selected first color, and visible through part of the housing, a processor disposed inside the housing and operatively coupled with the touch screen display, and a memory disposed inside the housing and operatively coupled with the processor, and the memory may store (Continued)

instructions for, when executed, causing the processor to receive a first drawing input using the first stylus pen through the display, in response to the first drawing input, display the first drawing output on the display, and set a color of the first drawing output to the selected first color.

11 Claims, 24 Drawing Sheets

(51) Int. Cl.
  *G06F 3/041* (2006.01)
  *G06F 3/04883* (2022.01)

(56) References Cited

U.S. PATENT DOCUMENTS

| | | | |
|---|---|---|---|
| 2012/0182271 | A1 | 7/2012 | Wu et al. |
| 2014/0295814 | A1 | 10/2014 | Heo et al. |
| 2015/0347000 | A1 | 12/2015 | Ookawara |
| 2017/0115755 | A1* | 4/2017 | Jung .................... A61B 5/0205 |
| 2017/0131798 | A1* | 5/2017 | Geaghan ............. G06F 3/04162 |

FOREIGN PATENT DOCUMENTS

| | | |
|---|---|---|
| KR | 1020100016670 | 2/2010 |
| KR | 101398479 | 5/2014 |
| KR | 1020140091502 | 7/2014 |
| KR | 1020140117150 | 10/2014 |
| KR | 1020140142223 | 12/2014 |
| KR | 1020140145480 | 12/2014 |
| KR | 1020160016278 | 2/2016 |
| KR | 1020160068099 | 6/2016 |
| KR | 1020170007051 | 1/2017 |
| KR | 1020180014446 | 2/2018 |

OTHER PUBLICATIONS

PCT/ISA/237 Written Opinion issued on PCT/KR2019/006102, dated Sep. 5, 2019, pp. 6.
European Search Report dated Aug. 4, 2021 issued in counterpart application No. 19843695.8-1216, 9 pages.
Korean Office Action dated Apr. 26, 2022 issued in counterpart application No. 10-2018-0089090, 16 pages.

* cited by examiner

METHOD FOR PROCESSING INPUT MADE WITH STYLUS PEN AND ELECTRONIC DEVICE THEREFOR

PRIORITY

This application is a National Phase Entry of International Application No. PCT/KR2019/006102, which was filed on May 22, 2019, and claims priority to Korean Patent Application No. 10-2018-0089090, filed in the Korean Intellectual Property Office on Jul. 31, 2018, the entire content of each of which is incorporated herein by reference.

TECHNICAL FIELD

Various embodiments of the present invention relate to a method for processing an input using a stylus pen and an electronic device thereof.

BACKGROUND ART

Electronic devices (e.g., mobile terminals, smart phones, or wearable devices) may provide various functions. For example, in addition to a basic voice communication function, a smart phone may provide a short-range wireless communication (e.g., Bluetooth, Wi-Fi, or near field communication (NFC)) function, a mobile communication function, a music or video playback function, a photographing function, or a navigation function.

Also, the electronic device may include various input sensing panels. For example, the electronic devices may include an input sensing panel such as a touch screen panel (TSP), a digitizer panel, or a force touch panel. The input sensing panel may be laminated or adhered to a display panel. The digitizer panel may support an input using a stylus pen.

With the digitizer panel which may interact with the stylus pen installed on the electronic device, the stylus pen may be used as an input means. For example, with the stylus pen and the electronic device positioned within a specific distance (e.g., a hover state) and in direct contact (e.g., a touch state), functions related to the stylus pen may be executed at the electronic device.

DISCLOSURE OF INVENTION

Technical Problem

Various embodiments of the present invention may provide a new user experience (UX) to a user by processing an input according to characteristics of a stylus pen.

Solution to Problem

According to various embodiments of the present invention, an electronic device may include a housing including an inner space and a hole connected to the inner space, a touch screen display including a first stylus pen insertable into the inner space through the hole and having an external surface including a selected first color, and visible through part of the housing, a processor disposed inside the housing and operatively coupled with the touch screen display, and a memory disposed inside the housing and operatively coupled with the processor, and the memory may store instructions for, when executed, causing the processor to receive a first drawing input using the first stylus pen through the display, in response to the first drawing input, display the first drawing output on the display, and set a color of the first drawing output to the selected first color.

According to various embodiments of the present invention, an electronic device may include a housing including an inner space and a hole connected to the inner space, and having an external surface including a third color selected, a first stylus pen insertable into the inner space through the hole, and having an external surface including a selected first color, a touch screen display visible through part of the housing, a processor disposed inside the housing and operatively coupled with the touch screen display, and a memory disposed inside the housing and operatively coupled with the processor, and the memory may store instructions for, when executed, causing the processor to receive a first drawing input using the first stylus pen through the display, in response to the first drawing input, display the first drawing output on the display, and selectively determine a color of the first drawing output, based at least in part on the selected first color or the selected third color.

According to various embodiments of the present invention, an electronic device may include a housing including an inner space and a hole connected to the inner space, a first stylus pen insertable into the inner space through the hole, and having an external surface including a selected first color, a touch screen display visible through part of the housing, a processor disposed inside the housing and operatively coupled with the touch screen display, and a memory disposed inside the housing and operatively coupled with the processor, and the memory may store instructions for, when executed, causing the processor to display a user interface having a background of the first color on the display, receive a first drawing input using the first stylus pen through the user interface, in response to the first drawing input, display the first drawing output on the display, and set a color of the first drawing output to a selected fifth color which is different from the selected first color.

According to various embodiments of the present invention, an operating method of an electronic device may include detecting that a stylus pen is inserted into a hole formed in a housing of the electronic device, in response to the detection, pairing with the stylus using a wireless communication circuit, obtaining information of the stylus pen received during the pairing, and processing an input using the stylus based at least in part on the obtained information of the stylus pen.

Advantageous Effects of Invention

An electronic device according to various embodiments, may provide a new user experience (UX), by processing a proximity input using a stylus pen based on unique characteristics of the stylus pen or the electronic device.

BEST MODE FOR CARRYING OUT THE INVENTION

Hereinafter, various embodiments will be described in detail with reference to the accompanying drawings.

Figure 1:
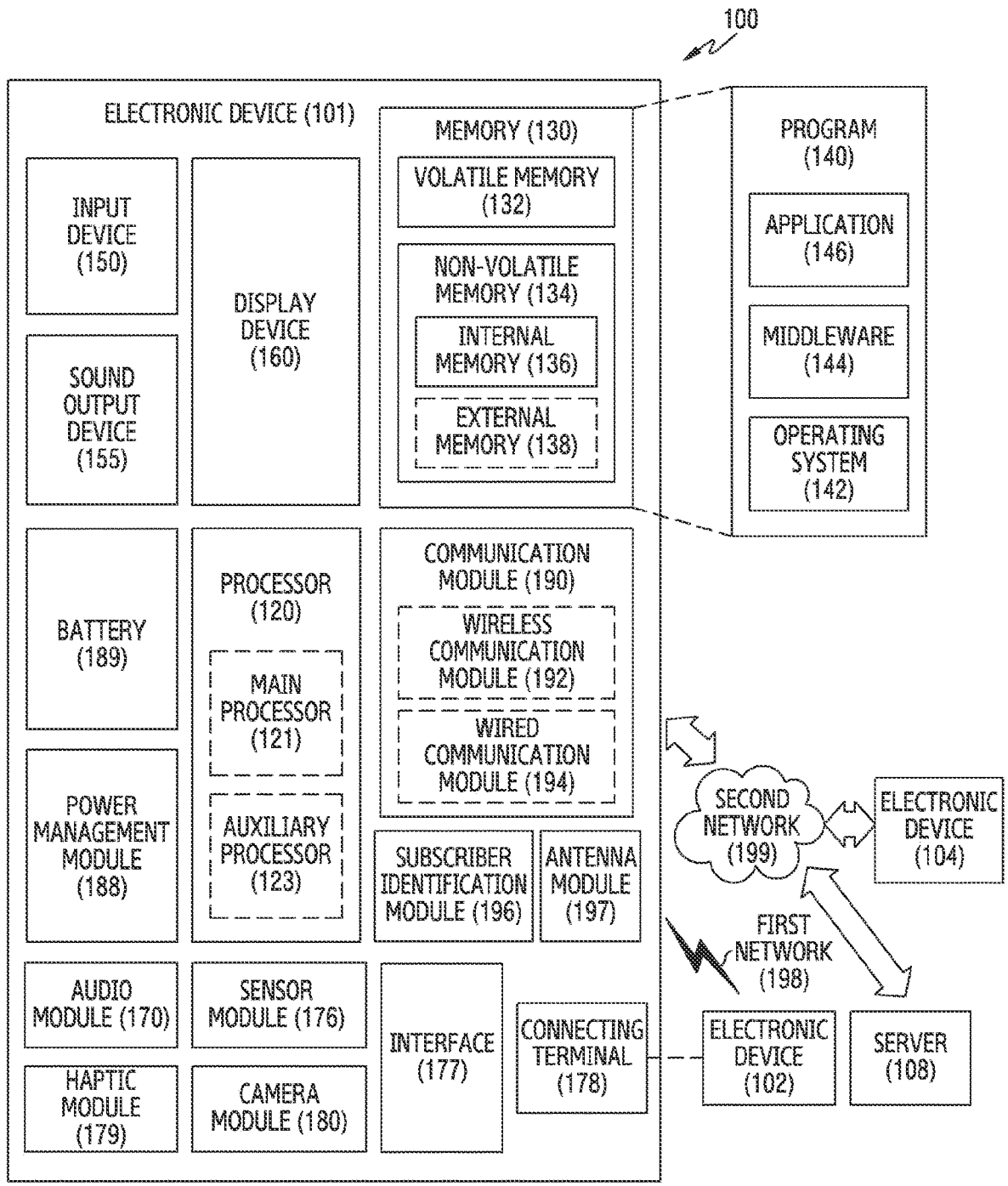
FIG. 1 is a block diagram of an electronic device in a network environment according to various embodiments of the present invention.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
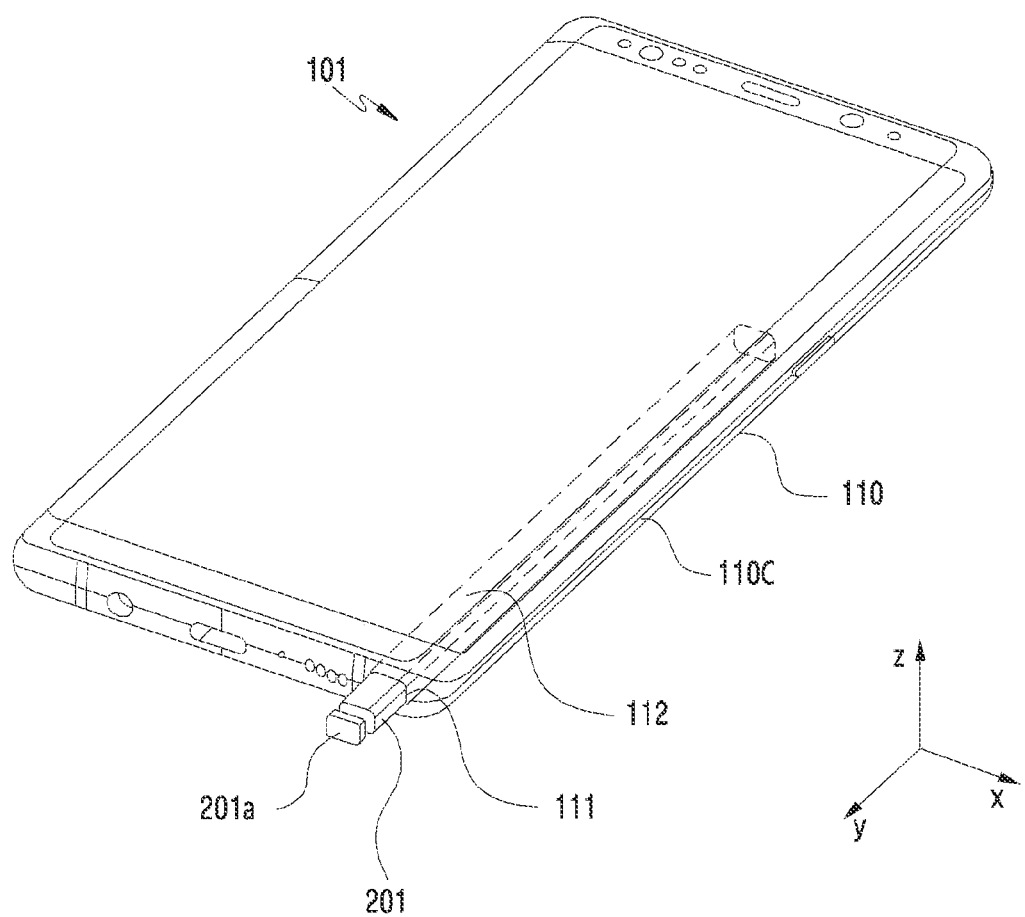
FIG. 2 is a perspective view of an electronic device of an embodiment, including a digital pen.

FIG. 2 is a perspective view of an electronic device of an embodiment, including a digital pen.

Referring to FIG. 2, an electronic device 101 may include the configuration shown in FIG. 1, and may include a structure into which a digital pen 201 (e.g., a stylus pen) may be inserted. The electronic device 101 may include a housing 110, and may include a hole 111 in a portion of the housing, for example, a portion of a side surface 110C. The electronic device 101 may include a receiving space 112 connected to the hole 111, and the digital pen 201 may be inserted into the receiving space 112. According to the embodiment illustrated, the digital pen 201 may include a pushable button 201a, for easily taking the digital pen 201 out of the receiving space 112 of the electronic device 101, at one end. If the button 201a is pressed, opposing mechanisms (e.g., at least one spring) associated with the button 201a may work, to detach the digital pen 201 from the receiving space 112.

Figure 3:
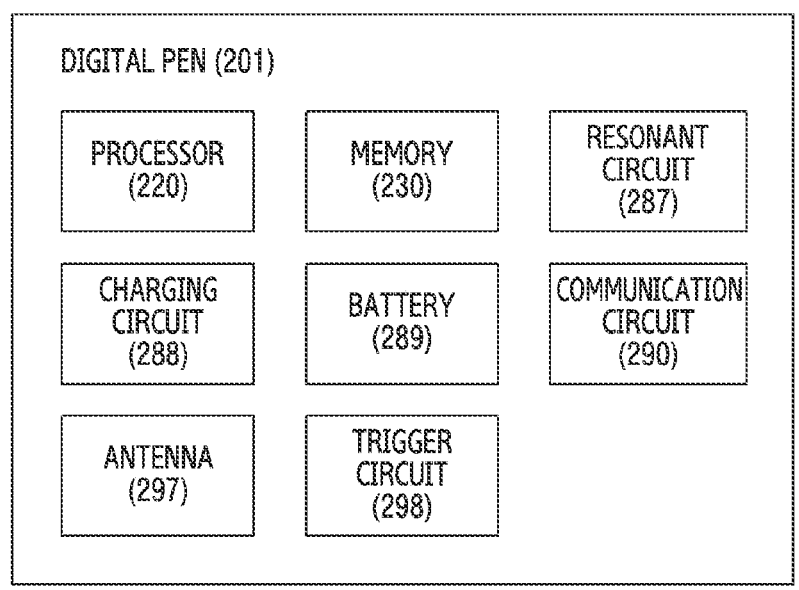
FIG. 3 is a block diagram illustrating a digital pen of an embodiment.

FIG. 3 is a block diagram illustrating a digital pen of an embodiment.

Referring to FIG. 3, a digital pen 201 according to an embodiment may include a processor 220, a memory 230, a resonant circuit 287, a charging circuit 288, a battery 289, a communication circuit 290, an antenna 297 and/or a trigger circuit 298. In one embodiments, the processor 220, at least part of the resonant circuit 287, and/or at least part of the communication circuit 290 of the digital pen 201 may be configured on a printed circuit board or in the form of a chip. The processor 220, the resonant circuit 287 and/or the communication circuit 290 may be electrically connected with the memory 230, the charging circuit 288, the battery 289, the antenna 297 or the trigger circuit 298. The digital pen 201 according to an embodiment may include only a resonance circuit and a button.

The processor 220 may include a generic processor configured to execute a customized hardware module or software (e.g., an application program). The processor may include a hardware component (function) or a software component (program) including at least one of various sensors of the digital pen 201, a data measuring module, an input/output interface, a module which manages a state or an environment of the digital pen 201 or a communication module. The processor 220 may include, for example, a combination of one or two or more of hardware, software, or firmware. According to an embodiment, the processor 220 may receive a proximity signal corresponding to an electromagnetic signal generated from a digitizer 160 of the electronic device 101 through the resonant circuit 287. If identifying the proximity signal, the resonant circuit 287 may be controlled to transmit an electro-magnetic resonant (EMR) input signal to the electronic device 101.

The memory 230 may store information related to the operation of the digital pen 201. For example, the information may include information for communication with the electronic device 101 and frequency information related to an input operation of the digital pen 201.

The resonant circuit 287 may include at least one of a coil, an inductor or a capacitor. The resonant circuit 287 may be used for the digital pen 201 to generate a signal including the resonant frequency. For example, for the signal generation, the digital pen 201 may use at least one of an electromagnetic resonance (EMR) scheme, an active electrostatic (AES) scheme, or an electrically coupled resonance (ECR) scheme. If the digital pen 201 transmits a signal by the EMR scheme, the digital pen 201 may generate a signal including a resonance frequency, based on an electromagnetic field generated from an inductive panel of the electronic device 101. If the digital pen 201 transmits a signal by the AES scheme, the digital pen 201 may generate a signal by using capacity coupling with the electronic device 101. If the digital pen 201 transmits a signal by the ECR scheme, the digital pen 201 transmits a signal including a resonance frequency, based on an electric field generated from a capacitive device of the electronic device. According to an embodiment, the resonant circuit 287 may be used to change an intensity or a frequency of the electromagnetic field according to a user's manipulation state. For example, the resonant circuit 287 may provide a frequency for recognizing a hovering input, a drawing input, a button input or an erasing input.

If the charging circuit 288 is connected to the resonant circuit 287 based on a switching circuit, the charging circuit 288 may rectify the resonant signal generated by the resonant circuit 287 to a direct current signal and provide it the battery 289. According to an embodiment, the digital pen 201 may identify whether the digital pen 201 is inserted into the electronic device 101, using a voltage level of the direct current signal detected by the charging circuit 288.

The battery 289 may be configured to store power required for the operation of the digital pen 201. The battery may include, for example, a lithium-ion battery, or a capacitor, and may be rechargeable or interchangeable. According to an embodiment, the battery 289 may be charged using the power (e.g., the direct current power (direct current power)) provided from the charging circuit 288.

The communication circuit 290 may be configured to perform the wireless communication function between the digital pen 201 and the communication module 190 of the electronic device 101. According to an embodiment, the communication circuit 290 may transmit state information and input information of the digital pen 201 to the electronic device 101 using a short-range communication scheme. For example, the communication circuit 290 may transmit direction information (e.g., motion sensor data) of the digital pen 201 acquired through the trigger circuit 298, voice information inputted through a microphone, or remaining capacity information of the battery 289 to the electronic device 101. For example, the short-range communication scheme may include at least one of Bluetooth, Bluetooth low energy (BLE), or wireless local area network (WLAN).

The antenna 297 may be used to transmit or receive the signal or the power to outside (e.g., the electronic device 101) or from the outside. According to an embodiment, the digital pen 201 may include a plurality of antennas 297, and among them, select at least one antenna 297 adequate for the communication scheme. Through the at least one antenna 297 selected, the communication circuit 290 may exchange the signal or the power with an external electronic device.

The trigger circuit 298 may include at least one button or sensor circuit. According to an embodiment, the processor 220 may identify an input scheme (e.g., touch or press) or a type (e.g., an EMR button or a BLE button) of the button of the digital pen 201. According to an embodiment, the sensor circuit may generate an electrical signal or a data value corresponding to an internal operating state of the digital pen 201 or an external environmental state. For example, the sensor circuit may include at least one of a motion sensor, a battery remaining capacity detecting sensor, a pressure sensor, an optical sensor, a temperature sensor, a geomagnetic field sensor, and a biometric sensor. According to an embodiment, the trigger circuit 298 may transmit a trigger signal to the electronic device 101 using the input signal of the button or the signal through the sensor.

Figure 4:
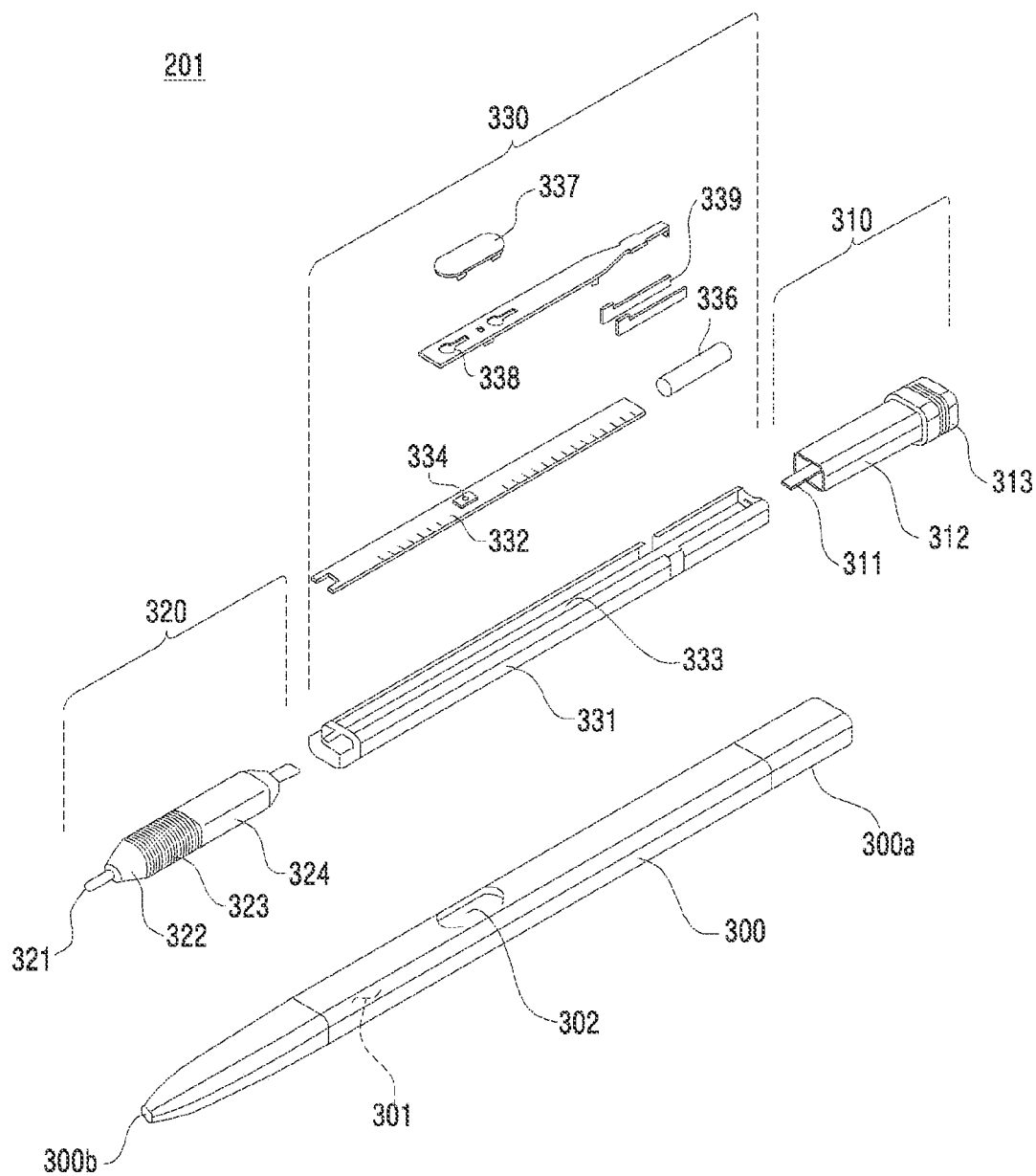
FIG. 4 is an exploded perspective view of a digital pen according to an embodiment.

FIG. 4 is an exploded perspective view of a digital pen according to an embodiment.

Referring to FIG. 4, the digital pen 201 may include a housing 300 which forms an external shape of the digital pen 201 and an inner assembly inside the pen housing 300. In the embodiment illustrated, the internal assembly, including various components mounted inside the pen, may be inserted into the pen housing 300 through one assembly operation.

The pen housing 300 may have a shape extending long between a first end 300a and a second end 300b, and may include a receiving space 301 therein. The pen housing 300 may have an oval cross section including a major axis and a minor axis, and may be formed in a cylindrical shape on the whole. A cross section of the receiving space 301 of the electronic device 101 may be also formed in an oval shape corresponding to the shape of the pen housing 300. The pen housing 300 may include a synthetic resin (e.g., plastic) and/or a metallic material (e.g., aluminum). According to an embodiment, the second end 300b of the pen housing 300 may be formed of a synthetic resin material.

The inner assembly may have a shape which is extended long to correspond to the shape of the pen housing 300. The inner assembly may be divided into three configurations among a longitudinal direction. For example, the inner assembly may include an ejection member 310 disposed at a position corresponding to the first end 300a of the pen housing 300, a coil unit 320 disposed at a position corresponding to the second end 300b of the pen housing 300, and a circuit board unit 330 disposed at a position corresponding to a body of the housing.

The ejection member 310 may include a configuration for ejecting the digital pen 201 from the receiving space 112 of the electronic device 101. According to an embodiment, the ejection member 310 may include a shaft 311, an ejection body 312 disposed around the shaft 311 and forming an overall exterior of the ejection member 310 and a button unit 313. If the inner assembly is completely inserted into the pen housing 300, a portion including the shaft 311 and the ejection body 312 may be surrounded by the first end 300a of the pen housing 300, and the button unit 313 (e.g., 201a of FIG. 2) may be exposed outside the first end 300a. A plurality of components not shown, for example, cam members or elastic members may be disposed in the ejection member 310 to build a push-pull structure. In an embodiment, the button unit 313 may be coupled substantially with the shaft 311 and perform a linear reciprocating motion with respect to the ejection body 312. According to various embodiments, the button unit 313 may include a button having a latching structure allowing the user to eject the digital pen 201 using his/her nail. According to an embodiment, the digital pen 201 may include a sensor for detecting the linear reciprocating motion of the shall 311, and thus provide a different input scheme.

The coil unit 320 may include a pen tip 321 exposed outside the second end 300b if the inner assembly is completely inserted into the pen housing 300, a packing ring 322, a coil 323 wound multiple times, and/or a pen pressure detector 324 for acquiring a pressure change according to pressing the pen tip 321. The packing ring 322 may include epoxy, rubber, urethane or silicon. The packing ring 322 may be disposed for the sake of protection against water and dust, and protect the coil unit 320 and the circuit board unit 330 from water or dust. According to an embodiment, the coil 323 may generate a resonant frequency in a set frequency band (e.g., 500 kHz), and control a resonant frequency formed by the coil 323 within a specific range in conjunction with at least one element (e.g., a capacitor).

The circuit board unit 330 may include a printed circuit board 332, a base 331 surrounding at least one surface of the printed circuit board 332, and an antenna. According to an embodiment, a board receiving unit 333 for receiving the printed circuit board 332 may be formed on a top surface of the base 331, and the printed circuit board 332 may be secured in the board receiving unit 333. According to an embodiment, the printed circuit board 332 may include an upper surface and a lower surface, the upper surface may include a variable capacitor or a switch 334 connected to the coil 323, and the lower surface may include a charging circuit, a battery, or a communication circuit. The battery may include an electric double layered capacitor (EDLC). The charging circuit is disposed between the coil 323 and the battery, and may include a voltage detector circuitry and a rectifier.

The antenna may include an antenna structure 339 such as the example shown in FIG. 4 and/or an antenna embedded in the printed circuit board 332. According to various embodiments, the switch 334 may be disposed on the printed circuit board 332. A side button 337 of the digital pen 201 may be used to press the switch 334 and exposed to the outside through a side opening 302 of the pen housing 300. If the side button 337 is supported by a support member 338 and no external force is exerted to the side button 337, the support member 338 may provide an elastic restoring force to restore or maintain the side button 337 at a specific position.

The circuit board unit 330 may include another packing ring such as an O-ring. For example, the O-ring formed with an elastic material may be disposed at both ends of the base 331 to form a sealing structure between the base 331 and the pen housing 300. In some embodiment, the support member 338 may build the sealing structure by closely attaching in part to an inner wall of the pen housing 300 around the side opening 302. For example, the circuit board unit 330 may also build a waterproof and dustproof structure similar to the packing ring 322 of the coil unit 320.

The digital pen 201 may include a battery receiving unit 335 for receiving a battery 336 on a top surface of the base 331. The battery 336 mounted in the battery receiving unit 335 may include, for example, a cylinder-type battery.

The digital pen 201 may include a microphone (not shown). The microphone may be connected directly to the printed circuit board 332, or to a separate flexible printed circuit board (FPCB) (not shown) coupled with the printed circuit board 332. According to various embodiments, the microphone may be disposed at a position parallel with the side button 337 in the longitudinal direction of the digital pen 301.

Figure 5:
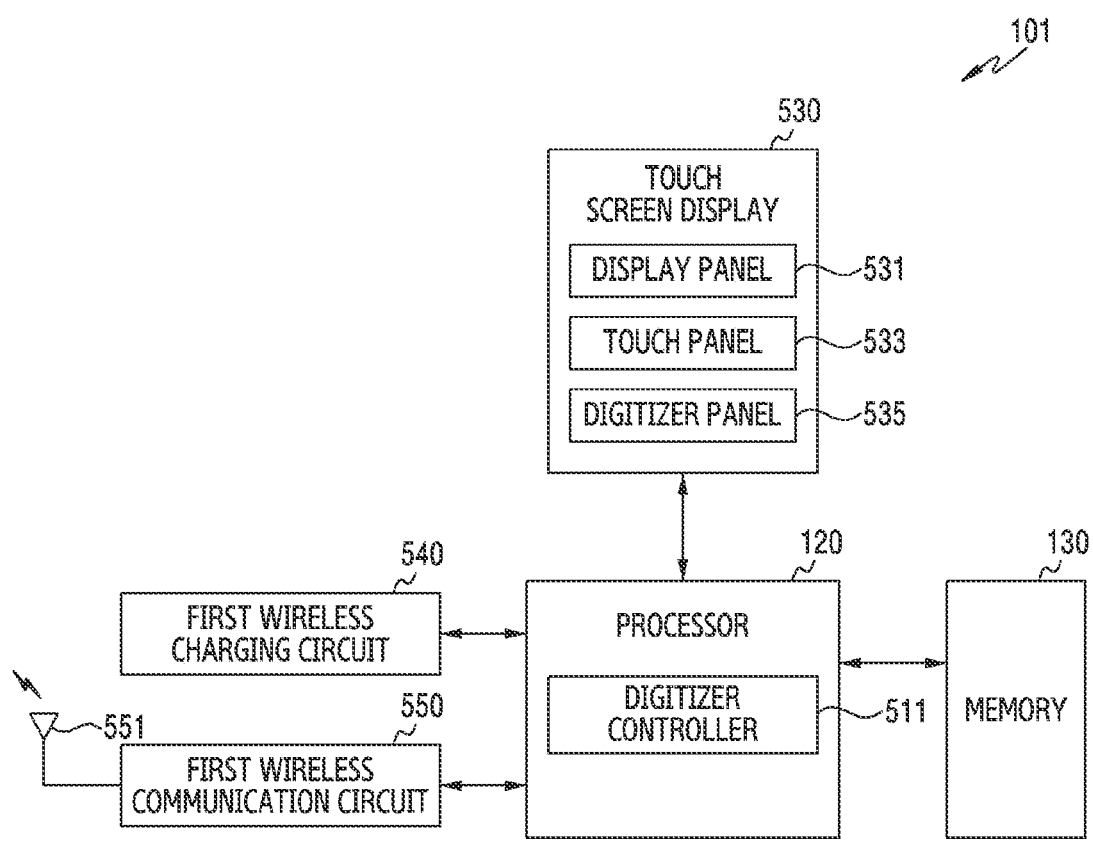
FIG. 5 is another block diagram of an electronic device according to various embodiments of the present invention.

FIG. 5 is another block diagram of an electronic device according to various embodiments of the present invention.

Referring to FIG. 5, an electronic device 101 according to an embodiment of the present invention may include a processor 120, a memory 130, a touch screen display 530 (e.g., the display device 160 of FIG. 1), a first wireless charging circuit 540, and a first wireless communication circuit 550 (e.g., the wireless communication module 192 of FIG. 1).

The processor 120 according to an embodiment of the present invention may control the overall operation of the electronic device 101. For example, the processor 120 may be disposed inside the housing 110 of the electronic device 101, operatively or electrically connected with a memory 120, a touch screen display 530, a first wireless charging circuit 540 and a first wireless communication circuit 550, and control the components of the electronic device 101.

The processor 120 according to an embodiment of the present invention may include a digitizer controller 511. The digitizer controller 511 may transmit a position detection signal through the digitizer panel 535, and receive a response signal from the resonant circuit 287 of a stylus pen (e.g., the digital pen 201 of FIG. 2). The digitizer controller 511 may determine position information of the stylus pen 201 by analyzing the received response signal. Alternatively, the digitizer controller 511 may transmit a detection signal through a coil included in the first wireless charging circuit 540, and receive a signal from the stylus pen 201 to determine whether the stylus pen 201 is physically or electrically coupled. Alternatively, the digitizer controller 511 may apply a charging signal of a higher voltage than the detection signal to the coil of the first wireless charging circuit 540 and charge a battery (or a super capacitor) (e.g., the battery 289 of FIG. 3) of the stylus pen 201.

According to an embodiment, the digitizer controller 511 may be a separate configuration. The processor 120 may receive whether the stylus pen (e.g., the stylus pen 201 of FIG. 2) is inserted from the digitizer controller 511, transmit a wireless communication connection command to the first wireless communication circuit 550 based on the received insertion, and transmit a charging signal and a control signal to the digitizer controller 511 based on data received from the first wireless communication circuit 550.

The memory 130 according to an embodiment of the present invention may be operatively (or electrically) connected with the processor 120. The memory 130 may store pairing related data of the stylus pen 201 previously connected. Also, the memory 130 may store attribute information corresponding to characteristic information of the stylus pen 201. According to an embodiment, the attribute information may be stored in a logical location indicated by a predefined value.

The touch screen display 530 according to an embodiment of the present invention may be exposed through a part of the housing 110, and may provide an input function and an output function. For example, the touch screen display 530 may include a display panel 531, a touch panel 533 and a digitizer panel 535. The display panel 531 may be formed with, for example, a liquid crystal display (LCD), a light emitting diode (LED) display, an organic LED (OLED) display, or a micro electro mechanical systems (MEMS) display, or an electronic paper display. The touch panel 533 may detect (or recognize) a change of physical characteristics (capacitance, or frequency) by various touch inputs (e.g., tap, double tap, touch, touch movement, or multi-touch) using an input tool (e.g., a finger), and forward it to the processor 120. The digitizer panel 535 may detect an electromagnetic change according to the input of the stylus pen 201, and transmit it to the digitizer controller 511 of the processor 120. The touch screen display 530 may further include a pressure sensing panel (not shown) for sensing the pressure. The input (e.g., hovering, touch input, etc.) of the stylus pen 201 detected through the digitizer panel 535 may be referred to as a 'proximity input'.

The first wireless charging circuit 540 according to an embodiment of the present invention may be disposed adjacent to the hole 111 formed inside the housing 110 of the electronic device 101. The first wireless charging circuit 540 may include at least one coil. The first wireless charging circuit 540 according to an embodiment of the present invention may supply power for charging the battery 289 of the stylus pen 201 inserted into the hole 111. The first wireless charging circuit 540 may be turned on for a first designated time (e.g., 9 seconds), and turned off for a second designated time (e.g., 1 second) under control of the processor 120 or the digitizer controller 511. The first wireless charging circuit 540 according to an embodiment of the present invention may be turned on or off in an arbitrary pattern under the control of the processor 120 or the digitizer controller 511, to identify or verify whether the stylus pen 201 currently connected for the communication is a pen inserted into the hole 111.

The first wireless communication circuit 550 according to an embodiment of the present invention may be disposed inside the housing 110 of the electronic device 101, and wirelessly communicate with an external electronic device (e.g., the stylus pen 201 of FIG. 2). The first wireless communication circuit 550 may receive information from the stylus pen 201 through the antenna 551 during or after charging the stylus pen 201.

The first wireless communication circuit 550 may support the Bluetooth protocol. For example, the first wireless communication circuit 550 may be a circuit for the BLE communication. The first wireless communication circuit 550 according to an embodiment of the present invention may scan the stylus pen 201 which is connectable if the insertion of the stylus pen (e.g., the stylus pen 201 of FIG. 2) is detected or the charging signal is applied. The first wireless communication circuit 550 may receive an advertising signal of the stylus pen 201. The advertising signal may include at least one of identification information or characteristic information of the stylus pen 201.

Figure 6A:
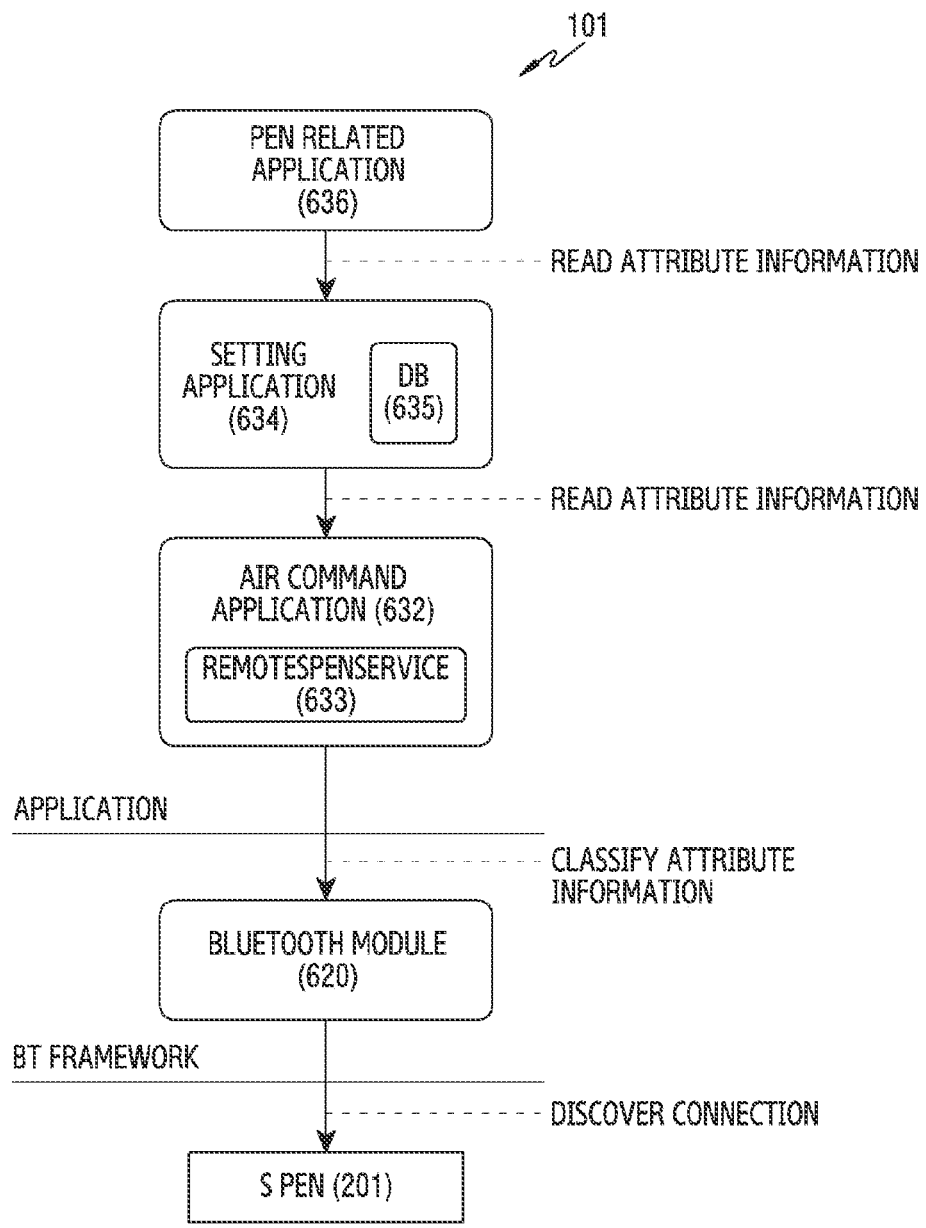
FIG. 6A is a diagram illustrating a functional configuration of an electronic device according to various embodiments of the present invention.

FIG. 6A is a diagram illustrating a functional configuration of an electronic device according to various embodiments of the present invention.

Referring to FIG. 6A, the electronic device 101 may include a Bluetooth module 620 belonging to a Bluetooth (BT) framework, an air command application 632 belonging to an application layer, a setting application 634, and a pen related application 636.

The Bluetooth module 620 may be a block for communicating with the stylus pen 201. The Bluetooth module 620 may perform the connection or the pairing with the stylus pen 201 according to the Bluetooth standard, and exchange information. According to an embodiment of the present invention, the Bluetooth module 620 may establish a wireless connection based on whether the stylus pen 201 is attached, and perform the communication.

The air command application 632 is an application related to management of the stylus pen 201, and may be executed by detachment of the stylus pen 201 from the hole 111. The air command application 632 may include a remoteSpenService 633 as an activity which monitors a state related to the stylus pen 201. For example, the remoteSpenService 633 may identify whether the stylus pen 201 is paired or inserted into the hole 111, and notify to the air command application 632. The air command application 632 may extract characteristic information from the pairing information received from the stylus pen 201, and determine whether to store it as attribute information based on the pairing state.

The setting application 634 may record information in a database (DB) 635 and read the recorded information. According to an embodiment of the present invention, the setting application 634 may store the attribute information corresponding to the characteristic information of the stylus pen 201 provided from the air command application 632 in a predefined area of the DB 635. According to an embodiment of the present invention, the setting application 634 may provide the attribute information stored in the predefined area of the DB 635 to the pen related application 636.

The pen related application 636 may be an application for providing various functions using the stylus pen 201. The pen related application 636 may perform a corresponding function based on the input of the stylus pen 201. For example, the pen related application 636 may include a screen off memo application, a pen separation effect application, and the like. The pen related application 636 may read the attribute information corresponding to the characteristic information of the stylus pen 201 stored in the predefined area of the DB 635, and reflect the attribute information in executing the corresponding function. Since the attribute information is stored in the predefined area of the DB 635, the pen related application 636 may read the attribute information stored in the DB 635 without separate information.

According to various embodiments of the present invention, the attribute information may be determined from the characteristic information of the stylus pen 201, and the attribute information may be reflected in a function of a pen related application (e.g., the pen related application 636).

According to an embodiment, the characteristic information may be a color code stored in the stylus pen 201, and the attribute information may be a color value corresponding to the color code. In this case, the color value may be used to determine the color displayed if the pen related application 636 is executed. Embodiments for using the color code are described below.

The present invention relates to a technique for receiving the characteristic information (e.g., a color code) of the stylus pen 201 paired with the electronic device 101 during the pairing operation, determining and storing the attribute information related to the proximity input of the stylus pen 201 based on the received characteristic information, and processing the proximity input of the stylus pen 201 based on the stored attribute information.

Figure 6B:
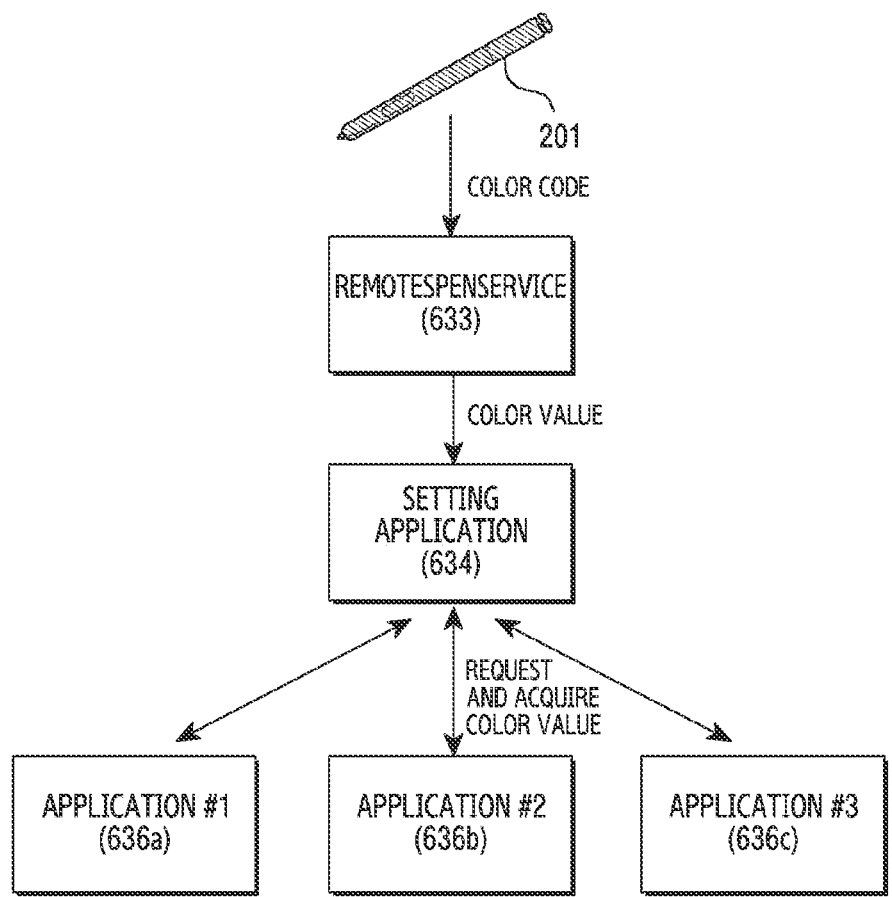
FIG. 6B is a diagram illustrating a concept of using characteristic information of a stylus pen in an electronic device according to various embodiments of the present invention.

FIG. 6B is a diagram illustrating a concept of using the characteristic information of the stylus pen in the electronic device according to various embodiments of the present invention. FIG. 6B is a conceptual diagram illustrating the characteristic information (e.g., a color code) based on a module layer based on an embodiment of the present invention. FIG. 6B depicts an example where the characteristic information is the color code.

Referring to FIG. 6B, the stylus pen 201 may provide the color code to the remoteSpenService 633. The remoteSpenService 633 may provide the setting application 634 with a color value corresponding to the color code. In other words, the remoteSpenService 633 may receive, analyze and manage the color code from the stylus pen 201, and the setting application 634 may store the color value corresponding to the color code. A plurality of applications 636a, 636b, and 636c may request the color value from the setting application 634, acquire the color value, and then execute corresponding functions using the acquired color value. In other words, the applications 636a, 636b, and 636c for processing the proximity input of the stylus pen 201 may process the proximity input using the color value provided from the setting application 634.

Figure 7:
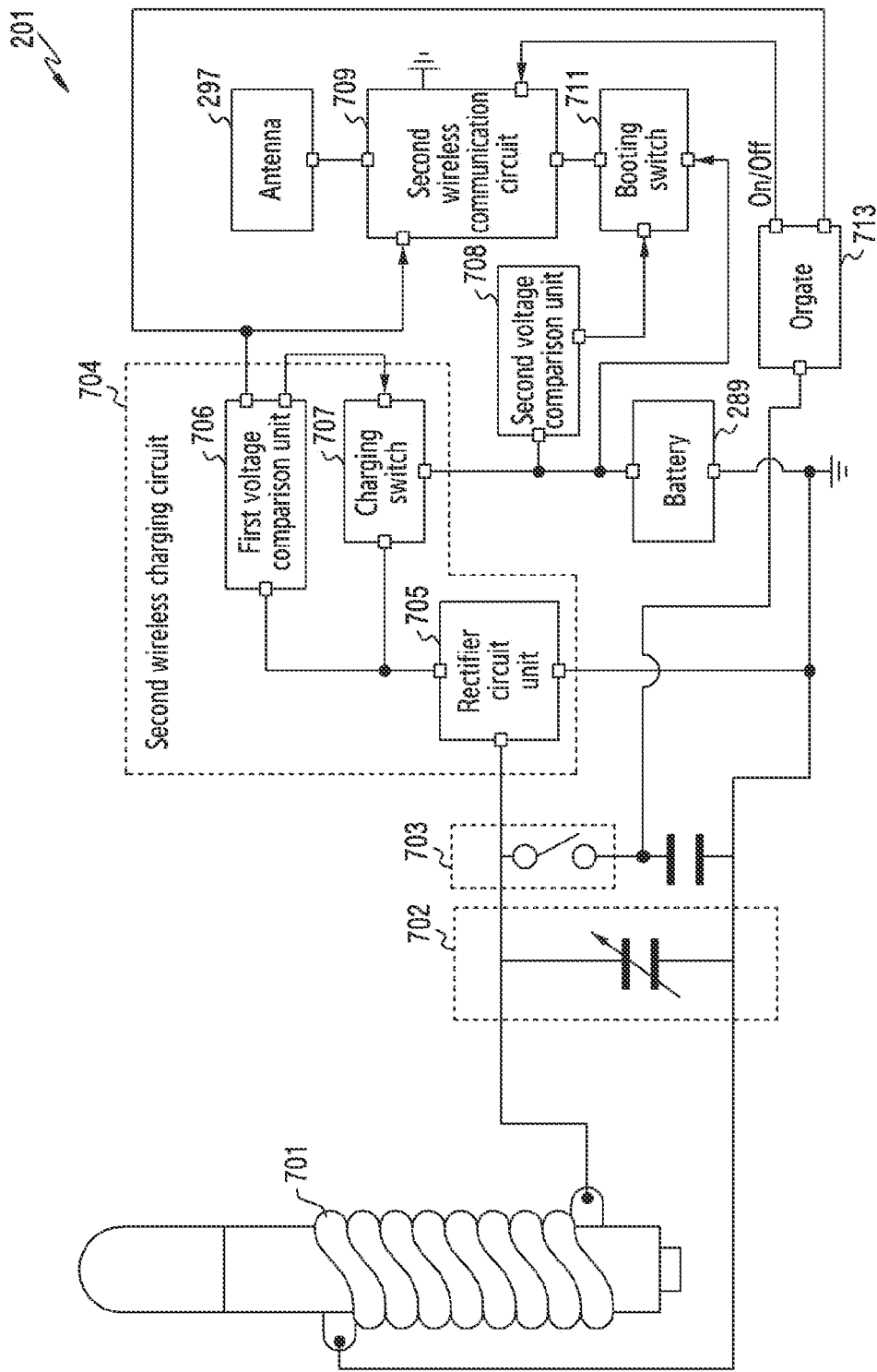
FIG. 7 is a diagram illustrating a structure of a stylus pen according to various embodiments of the present invention.

FIG. 7 is a block diagram of a stylus pen according to various embodiments of the present invention.

Referring to FIG. 7, the stylus pen 201 may include a coil 701 (e.g., the resonant circuit 287), a trimmer capacitor 702, a button switch 703, a rectifier circuit unit 705, a first voltage comparison unit 706, a charging switch 707, a second voltage comparison unit 708, a second wireless communication circuit 709, an antenna 297, a booting switch 711, a battery 289 and an OR gate 713. The rectifier circuit unit 705, the first voltage comparison unit 706, and the charging switch 707 may be referred to as a second wireless charging circuit 704 (e.g., the charging circuit 288).

The coil 701 may be the resonant circuit 287 for detecting an electromagnetic field signal applied from an external device (e.g., the first wireless charging circuit 540 of the electronic device 101) and transmitting a signal of a specific frequency. For example, the coil 701 may be an electromagnetic resonance (EMR) coil. The trimmer capacitor 702 according to an embodiment of the present invention may store an induced current applied to the coil 701. The button switch 703 according to an embodiment of the present invention may detect an input (e.g., press) of a button (e.g., the side button 337 of FIG. 4) disposed in one side of a pen housing (e.g., the pen housing 300 of FIG. 4) of the stylus pen 201. A resonant frequency of the coil 701 may be changed if the button switch 703 is turned on. At this time, the electronic device 101 may detect the input of the button 337 through the change of the resonance frequency.

The rectifier circuit unit 705 according to an embodiment of the present invention may rectify and convert an alternating current power applied to the coil 701 into a direct current power, and transmit the converted direct current power to the first voltage comparison unit 706 and the charging switch 707.

The first voltage comparison unit 706 may distinguish the position detection signal or the charging signal based on a voltage of the direct current power provided from the rectifier circuit unit 705. For example, the charging signal may have a greater value than the position detection signal. The first voltage comparison unit 706 may determine the position detection signal, which is smaller than a reference voltage (e.g., 7 V), and determine the charging signal, which is greater than the reference voltage. If the direct current power provided from the rectifier circuit unit 705 is the charging signal, the first voltage comparison unit 706 may provide the second wireless communication circuit 709 with a signal notifying that the stylus pen 201 is inserted into the electronic device 101. In addition, the first voltage comparison unit 706 may turn on the charging switch 707 for the charging signal, and turn off the charging switch 707 for the position detection signal.

The charging switch 707 may control charging on/off of the battery 289. For example, the charging switch 707 may provide or cut the direct current power provided from the rectifier circuit unit 705 to the battery 289 based on the output of the first voltage comparison unit 706. The second voltage comparison unit 708 may turn on or boot up the second wireless communication circuit 709 if the voltage of the battery 289 is greater than or equal to a specific voltage.

The second wireless communication circuit 709 may be disposed inside the housing 300 of the stylus pen 201, and connect wireless communication with an external device (e.g., the first wireless communication circuit 550 of the electronic device 101). The second wireless communication circuit 709 may support the Bluetooth protocol. For example, the second wireless communication circuit 709 may be a BLE communication circuit. The second wireless communication circuit 709 may transmit to the first wireless communication circuit 550 data based on the state information (e.g., unique information, charging related information) of the stylus pen 201 and/or the input of the button 337 through the antenna 297. The antenna 297 according to an embodiment of the present invention may be electrically connected with the second wireless communication circuit 709 to transmit and receive a wireless signal.

The booting switch 711 may control the on/off of the second wireless communication circuit 709. For example, the booting switch 711 may supply or cut the power of the battery 289 to the second wireless communication circuit 709 based on the output of the second voltage comparison unit 708. The battery 289, which is a rechargeable secondary battery, may be charged by the direct current power of the rectifier circuit unit 705, and supply the power to the second wireless communication circuit 709. For example, the battery 289 may be a super capacitor. The OR gate 713 may provide the second wireless communication circuit 709 with a signal according to a logical sum of the output of the first voltage comparison unit 706 and the button input.

According to various embodiments of the present invention, an electronic device (e.g., the electronic device 101) may include, a housing (e.g., the housing 110) including an inner space and a hole (e.g., the hole 111) connected to the inner space, a touch screen display (e.g., the touch screen display 530) including a first stylus pen (e.g., the stylus pen 201) insertable into the inner space through the hole and having an external surface including a selected first color, and visible through part of the housing, a processor (e.g., the processor 12) disposed inside the housing and operatively coupled with the touch screen display, and a memory (e.g., the memory 120) disposed inside the housing and operatively coupled with the processor, wherein the memory may store instructions for, when executed, causing the processor to receive a first drawing input using the first stylus pen through the display, in response to the first drawing input, display the first drawing output on the display, and set a color of the first drawing output to the selected first color.

According to various embodiments of the present invention, the electronic device (e.g., the electronic device 101) may further include a wireless communication circuit disposed inside the housing (e.g., the housing 110), and a pen memory (e.g., the memory 230) disposed inside a pen housing of the first stylus pen (e.g., the stylus pen 201), and storing information of the first stylus pen, and the instructions may cause the processor to detect insertion of the first stylus pen into the hole, in response to the detection, transmit a wireless communication connection request to the inserted first stylus pen, through the wireless communication circuit, in response to the wireless communication connection request, receive a wireless signal including the stored first stylus pen information from the inserted first stylus pen, and establish a wireless communication connection with the inserted first stylus pen, based on the received wireless signal.

According to various embodiments of the present invention, the first stylus pen (e.g., the stylus pen 201) information may include the selected first color information of the first stylus pen.

According to various embodiments of the present invention, the instructions cause the processor (e.g., the processor 120) to determine a color of the first drawing output, based on the selected first color information.

According to various embodiments of the present invention, the instructions cause the processor (e.g., the processor 120) to store the selected first color information in the memory (e.g., the memory 120). The selected first color information may be stored in a predefined area of the memory.

According to various embodiments of the present invention, the memory (e.g., the memory 120) may store an application program related to an input using the first stylus pen (e.g., the stylus pen 201), and the instructions cause the processor (e.g., the processor 120) to, based on the selected first color information of the first stylus pen, provide a user interface of the application program which sets whether to determine the color of the first stylus pen input on the display (e.g., the touch screen display 530).

According to various embodiments of the present invention, the wireless communication circuit may be configured to support a Bluetooth standard or BLE.

According to various embodiments of the present invention, the electronic device (e.g., the electronic device 101) may further include a wireless communication circuit disposed inside the housing (e.g., the housing 110), and the instructions cause the processor (e.g., the processor 120) to detect the insertion of the first stylus pen (e.g., the stylus pen 201) to the hole (e.g., the hole 111), in response to the detection, generate a charging signal for the first stylus pen, receive an advertising signal transmitted from the first stylus pen in response to the charging signal, obtain information of the first stylus pen contained in the received advertising signal, and store the obtained information of the first stylus pen.

According to various embodiments of the present invention, the instructions may cause the processor (e.g., the processor 120) to, after displaying the first drawing output on the display (e.g., the touch screen display 530), receive a second drawing input using a second stylus pen (e.g., the stylus pen 201) having an external surface including a selected second color which is different from the selected first color, in response to the second drawing input, display the second drawing output, while maintaining the first drawing output on the display (e.g., the display 160), and make a color of the second drawing output different from the color of the first drawing output.

According to various embodiments of the present invention, the instructions cause the processor (e.g., the processor 120) to display an interface for controlling a function which applies the color of the first drawing output as the selected first color on the display (e.g., the touch screen display 530), and enable or disable a function which applies the color of the first drawing output as the selected first color based on a user input inputted through the interface.

According to various embodiments of the present invention, an electronic device (e.g., the electronic device 101) may include a housing (e.g., the housing 110) including an inner space and a hole (e.g., the hole 111) connected to the inner space, and having an external surface including a third color selected, a first stylus pen (e.g., the stylus pen 201) insertable into the inner space through the hole, and having an external surface including a selected first color, a touch screen display (e.g., the touch screen display 530) visible through part of the housing, a processor (e.g., the processor 120) disposed inside the housing and operatively coupled with the touch screen display, and a memory (e.g., the memory 120) disposed inside the housing and operatively coupled with the processor, and the memory may store instructions for, when executed, causing the processor to receive a first drawing input using the first stylus pen through the display, in response to the first drawing input, display the first drawing output on the display, and selectively determine a color of the first drawing output, based at least in part on the selected first color or the selected third color.

According to various embodiments of the present invention, if the selected first color is the same as a default color for displaying the first drawing output, the color of the first drawing output may be determined to the selected third color.

According to various embodiments of the present invention, the color of the first drawing output may be determined to a fourth color which is different from the selected first color and the selected third color, if the selected first color and the selected third color are the same as the default color for displaying the first drawing output.

According to various embodiments of the present invention, an electronic device (e.g., the electronic device 101) may include a housing (e.g., the housing 110) including an inner space and a hole (e.g., the hole 111) connected to the inner space, a first stylus pen (e.g., the stylus pen 201) insertable into the inner space through the hole, and having an external surface including a selected first color, a touch screen display (e.g., the touch screen display 530) visible through part of the housing, a processor (e.g., the processor 120) disposed inside the housing and operatively coupled with the touch screen display, and a memory (e.g., the memory 120) disposed inside the housing and operatively coupled with the processor, and the memory may store instructions for, when executed, causing the processor to display a user interface having a background of the first color on the display, receive a first drawing input using the first stylus pen through the user interface, in response to the first drawing input, display the first drawing output on the display, and set a color of the first drawing output to a selected fifth color which is different from the selected first color.

According to various embodiments of the present invention, the first color may be black, and the fifth color may be white. According to other embodiment, the first color may be black, and the fifth color may be silver.

Figure 8:
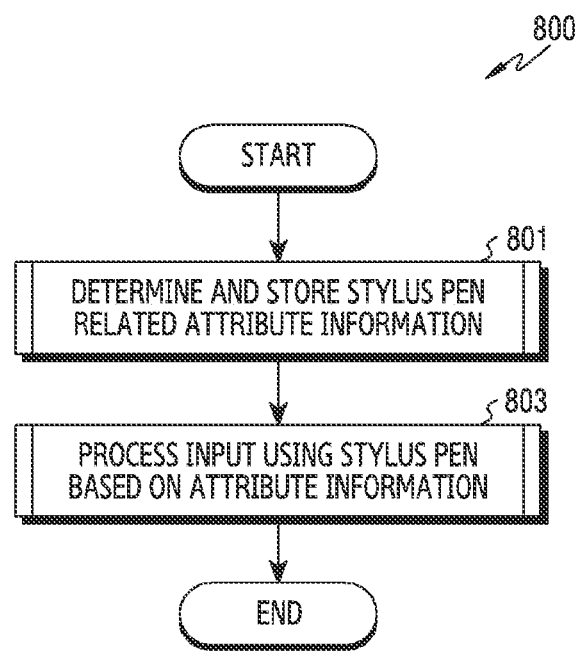
FIG. 8 is a flowchart for processing an input using a stylus pen in an electronic device according to various embodiments of the present invention.

FIG. 8 is a flowchart 800 for processing an input using a stylus pen in an electronic device according to various embodiments of the present invention. An operating entity of the flowchart 800 illustrated in FIG. 8 may be understood as the electronic device 101 or a component (e.g., the processor 120, the digitizer controller 511) of the electronic device 101.

Referring to FIG. 8, in operation 801, the electronic device 101 (e.g., the processor 120, the digitizer controller 511) may determine and store attribute information related to the stylus pen 201. The attribute information is a setting value which affects a function related to the stylus pen 201, and may be defined variously. For example, the attribute information may include at least one of a setting value related to a visual effect, a setting value related to content of an algorithm, or a setting value related to the control of the stylus pen 201.

In operation 803, the electronic device 101 may process an input using the stylus pen 201 based on the attribute information. The electronic device 101 may execute an application (e.g., the pen related application 636 of FIG. 6A) related to the stylus pen 201, and reflect the attribute information to a function provided by the application. Hence, a service which reflects the attribute information corresponding to the unique characteristics of the stylus pen 201 may be provided to the user.

Figure 9:
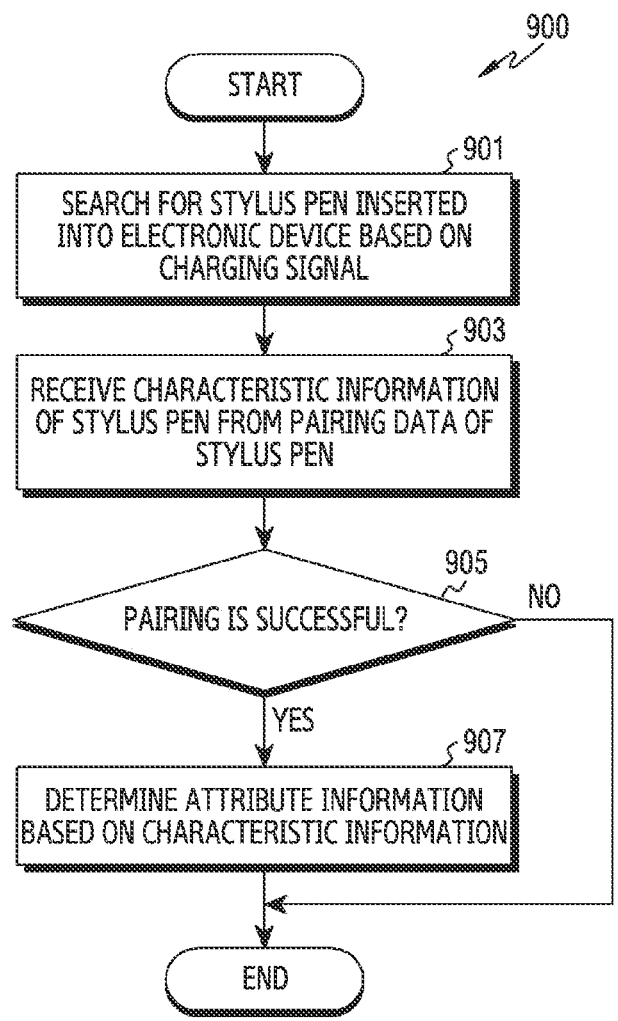
FIG. 9 is a flowchart for determining attribute information corresponding to a stylus pen in an electronic device according to various embodiments of the present invention.

FIG. 9 is a flowchart 900 for determining attribute information corresponding to a stylus pen in an electronic device according to various embodiments of the present invention. FIG. 9 is a part of operation 801 of FIG. 8, and an operation subject of the flowchart 900 illustrated may be understood as the electronic device 101 or the component (e.g., the processor 120, the digitizer controller 511) of the electronic device 101.

Referring to FIG. 9, in operation 901, the electronic device 101 (e.g., the processor 120, the digitizer controller 511) searches for the stylus pen 201 inserted into the electronic device 101 based on a charging signal. For example, the electronic device 101 may detect that the stylus pen 201 is inserted into the hole 111, and transmit a charging signal to induce the stylus pen 201 to transmit an advertising signal.

In operation 903, the electronic device 101 may receive characteristic information of the stylus pen 201 from pairing information of the stylus pen 201. For example, the electronic device 101 which searches for the stylus pen 201 may perform the pairing operation with the stylus pen 201 according to the Bluetooth standard, and obtain the characteristic information included in the advertising signal received during the pairing operation. The characteristic information is information related to the characteristics of the stylus pen 201, and may be related to the exterior (e.g., a color, a shape, a form, etc.) of the stylus pen 201 or other characteristics (e.g., a manufacturer, a production time, a model name, a rating, etc.) related to the stylus pen 201. For example, if the characteristic information is related to the color, a data packet for pairing with the stylus pen 201 may include a stylus pen name (e.g., 'SPen') of bytes of a specific number and a color code (e.g., 'ZK') of bytes of a specific number. The characteristic information may be stored in the memory 230 of the stylus pen 201 if the stylus pen 201 is manufactured.

In operation 905, the electronic device 101 may determine whether the pairing with the stylus pen 201 is successful. If the pairing is successful, in operation 907, the electronic device 101 may determine attribute information based on the characteristic information. For example, if the characteristic information is a color code, the attribute information may include a color value. The remoteSpenService 633 may detect that the pairing operation is completed, and determine the attribute information for a proximity input of the stylus pen 201 based on the characteristic information, and the setting application 634 may write the attribute information to the DB 635. For example, the electronic device 101 may extract the characteristic information (e.g., the color code) from the data packet for the pairing, and store the extracted characteristic information in the memory 130 if paired with the stylus pen 201. The electronic device 101 may determine the attribute information (e.g., the color value) associated with the proximity input of the stylus pen 201 based on the characteristic information. According to an embodiment, upon receiving the characteristic information of the color code 'KK', the electronic device 101 may determine the attribute information to RGB (256, 40, 40). In addition, the electronic device 101 may store the attribute information in the memory 130.

In the embodiment described with reference to FIG. 9, the electronic device 101 may obtain the characteristic information from a signal received during the pairing operation. According to another embodiment, the electronic device 101 may obtain the characteristic information by using a signal received during the search operation. For example, the characteristic information of the stylus pen 201 may be included in the advertising signal as an independent field or in a form combined with other information (e.g., name information).

As described above, the electronic device 101 according to an embodiment of the present invention may detect the insertion of the stylus pen 201, and perform a search algorithm to detect the inserted stylus pen 201, to pair with the stylus pen 201 inserted into the electronic device 101 among a plurality of stylus pens. The search algorithm proceeds by controlling the charging signal generated at the electronic device 101, and the stylus pen 201 transmit an advertising signal according to the Bluetooth standard, if there is no paired electronic device 101, according to a resonance signal for the charging signal.

Figure 10:
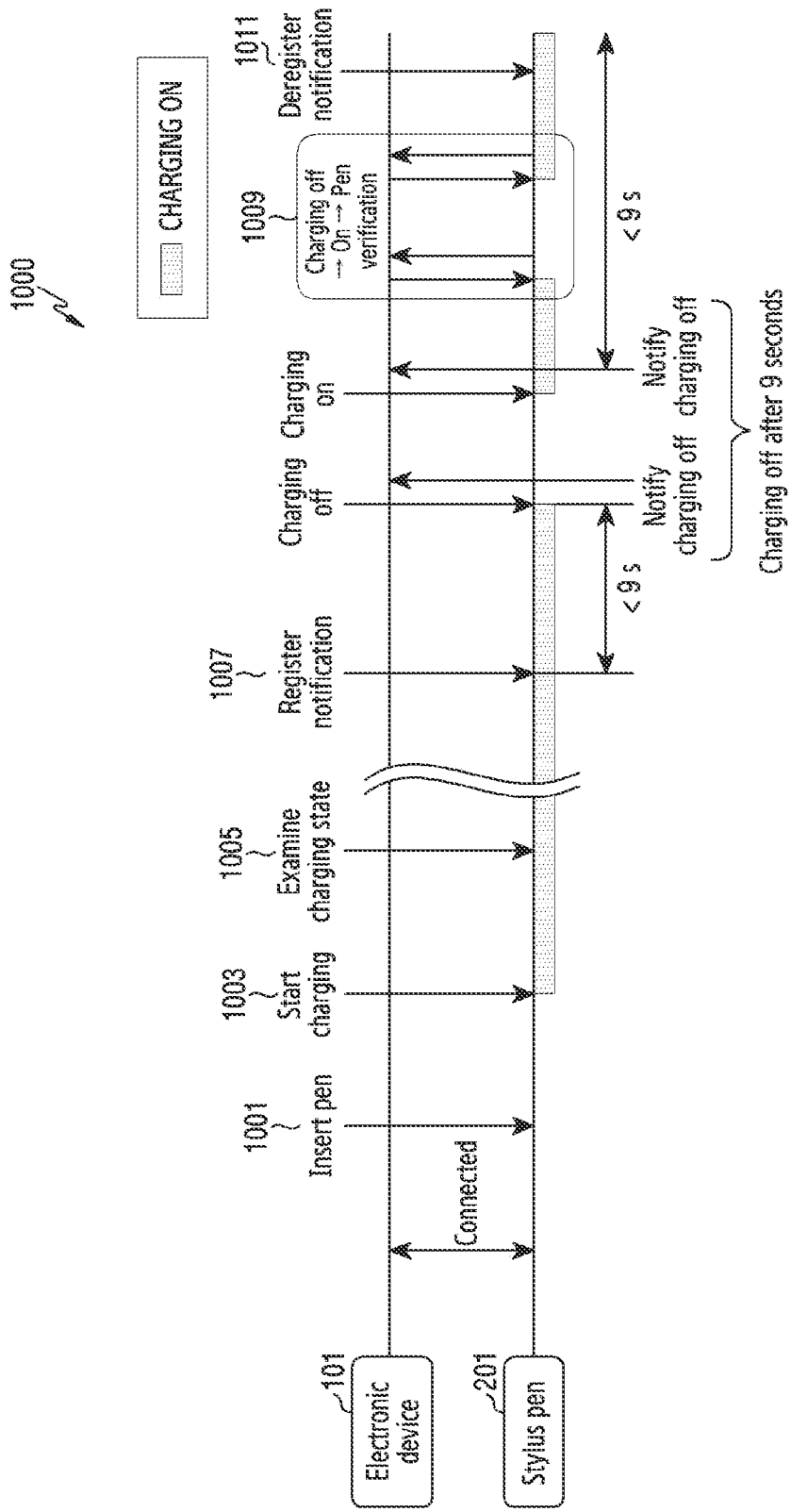
FIG. 10 is a diagram illustrating a method for searching for a stylus pen in an electronic device according to various embodiments of the present invention.

FIG. 10 is a diagram illustrating a method of searching for a stylus pen in an electronic device according to various embodiments of the present invention. FIG. 10 is an example of operation 901 of FIG. 9, and a method 1000 is an example of the search algorithm of the electronic device 101 for detecting the pen 201 to search for the inserted stylus pen 201, if there is no information of the paired stylus pen 201.

Referring to FIG. 10, the electronic device 101 may verify or identify whether the stylus pen 201 connected for the communication and the stylus pen inserted and charged are the same stylus pen. For example, the electronic device 101 may determine whether they are the same stylus pen by identifying attribute information indicating a charging state of the stylus pen 201 in a notification manner. Hereafter, it is assumed that the stylus pen 201 connected for the communication is inserted into the electronic device 101.

In operation 1001, an insertion event of the stylus pen 201 may occur. If the insertion event of the stylus pen 201 is identified, in operation 1003, the electronic device 101 may control to start, the charging by applying a charging signal to the inserted stylus pen 201. In operation 1005, the electronic device 101 may examine the charging state by reading the attribute information indicating the charging state.

If the stylus pen 201 communicatively connected to the electronic device 101 does not respond to a read command within a specific time, or if a response indicating no charging is received, the electronic device 101 may determine that the stylus pen 201 communicatively connected and the stylus pen inserted into the hole 111 of the electronic device 101 are different. By contrast, upon receiving the response indicating that the stylus pen 201 communicatively connected is being charged, the electronic device 101 may perform an operation of verifying whether the stylus pen 201 communicatively connected and the stylus pen being charged are the same. This is because the determination only with the charging state information may misrecognize the same although the stylus pen 201 communicatively connected and the stylus pen inserted into the electronic device 101 are not the same, if the stylus pen 201 communicatively connected is inserted into another electronic device in vicinity (within a communication range of the electronic device) and is being charged.

In operation 1007, the electronic device 101 may register a notification in the attribute information for obtaining the charging state of the stylus pen 201. In operation 1009, the electronic device 101 may turn off and on the charging signal in an arbitrary pattern on a charging on period. By turning the charging signal on and off, the electronic device 101 may identify whether the attribute information is synchronized and changed through the notification. If the on-off change of the charging signal and the change of the value of the attribute information value indicating the charging state transferred through the notification are the same, that is, if the on-off change and the change of the attribute information value are synchronized, the electronic device 101 may determine that the stylus pen 201 communicatively connected and the stylus pen inserted and being charged are the same. By contrast, if the on-off change and the change of the attribute information value are not the same, the electronic device 101 may determine that the stylus pen communicatively connected and the stylus pen inserted and being charged are different. If the verification is completed, in operation 1011, the electronic device 101 may deregister the notification.

In summary, the method for identifying the stylus pen 201 inserted into the hole 111 of the electronic device 101 is as follows. The electronic device 101 may scan a device of a name "SPen" received in response to the charging signal in response to the stylus pen 201 which performs advertising in response to the charging signal. As a result of the scan, two or more stylus pens may be detected. This is because other stylus pen inserted into other adjacent electronic device (e.g., the electronic device 102 of FIG. 1) may transmit an advertising signal in response to a charging signal of the other electronic device 102.

If two or more stylus pens are detected, the electronic device 101 may stop generating the charging signal. According to stopping the charging signal, the electronic device 101 may identify at least one stylus pen which disappears from the scan, that is, does not transmit the advertising signal as the charging signal of the electronic device 101 is stopped. Next, if the charging signal is turned on, the electronic device 101 may identify the stylus pen which retransmits the advertising signal. Based on the observation result of the on-off of the advertising signal according to the on-off of the charging signal, the electronic device 101 may identify a stylus pen (e.g., the stylus pen 201) which performs the advertising operation synchronized to the charging signal.

According to another embodiment, the electronic device 101 may randomly control the charging signal, repeat on and off of the charging signal until only one stylus remains, and thus identify the stylus pen 201 inserted into the hole 111 of the electronic device 101 and responding in synchronization with the charging signal.

After identifying the stylus pen 201 according to the above-described method, the electronic device 101 may receive pairing information of the identified stylus pen 201. The remoteSpenService 633 of the electronic device 101 may identify the pairing information, and extract the characteristic information of the stylus pen 201 from the pairing information.

The embodiment described with reference to FIG. 10 may be performed to identify the stylus pen 201 inserted into the hole 111 if there is no information of the stylus pen paired with the electronic device 101. However, there may be a situation in which a new stylus pen is inserted into the hole 111, while already paired with any one stylus pen. For example, the user may insert the stylus pen 201 into the hole 111 of the electronic device 101, to use a second stylus pen (e.g., the stylus pen 201) while using a first stylus pen. Hereafter, referring to FIG. 11, an embodiment for performing the pairing with the corresponding stylus pen as the unpaired stylus pen is inserted if there is a paired stylus pen is described.

Figure 11:
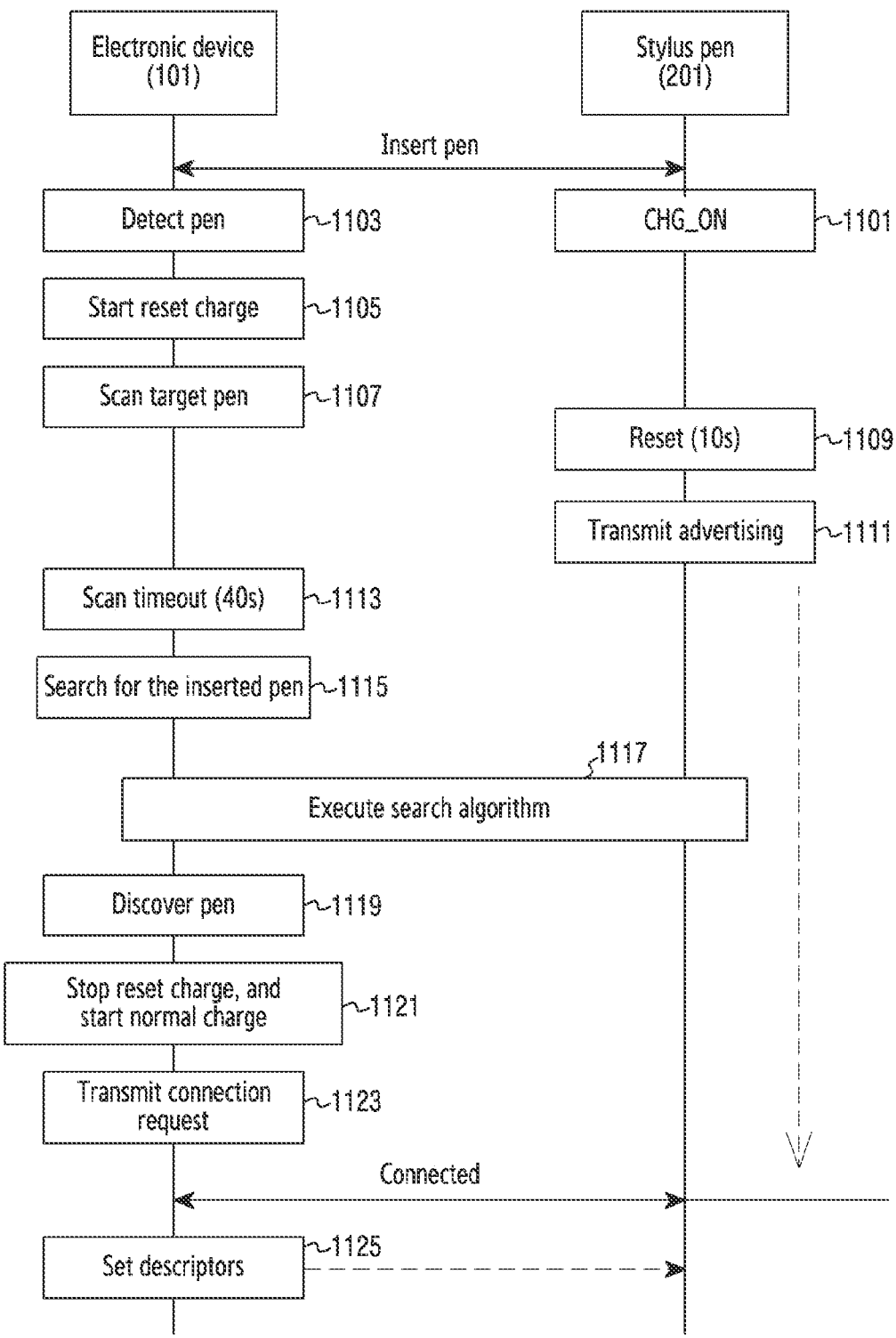
FIG. 11 is a diagram illustrating a method for conducting pairing if an unpaired stylus pen is inserted in an electronic device according to various embodiments of the present invention.

FIG. 11 is a diagram illustrating a method for pairing if an unpaired stylus pen is inserted in an electronic device according to various embodiments of the present invention.

Referring to FIG. 11, as the stylus pen 201 is inserted into the hole 111, in operation 1101, the stylus pen 201 may transit to a charge on (CHG_ON) state. In operation 1103, the electronic device 101 (e.g., the digitizer controller 511) may detect the insertion of the stylus pen 201. In operation 1105, the electronic device 101 may start reset charge. For example, the electronic device 101 may detect the hole 111 insertion of the stylus pen 201 based on the driving of the detection coil, and transmit a charging signal. In operation 1107, the electronic device 101 may perform the scan on a target pen. Since the electronic device 101 already stores information of the paired stylus pen, the electronic device 101 may perform the scan operation on the paired stylus pen. During the scan operation, the electronic device 101 may continuously transmit the charging signal, until the scan for the connection with the stylus pen is successful.

In operation 1109, the stylus pen 201 may perform reset. If the stylus pen 201 receives a continuous charging signal for a time (e.g., 10 seconds) over a specific threshold, the stylus pen 201 may control to redrive by resetting a wireless communication unit (e.g., the communication circuit 290 of FIG. 3, the second wireless communication circuit 709 of FIG. 7). In operation 1111, the stylus pen 201 may transmit an advertising signal.

In operation 1113, the electronic device 101 may determine a timeout of the scan operation. As the scan operation is continued for a specific time (e.g., 40 seconds) but the information of the paired stylus pen is not scanned, the electronic device 101 may determine that the the stylus pen 201 currently inserted into the hole 111 is other stylus pen than the paired stylus pen, and terminate the scanning operation. In operation 1115, the electronic device 101 may search for the inserted stylus pen 201. In operation 1117, the electronic device 101 may perform the search algorithm. For example, the search algorithm may be similar or identical to the method described with reference to FIG. 10. In operation 1119, the electronic device 101 may discover the stylus pen 201. In operation 1121, the electronic device 101 may stop the reset charge, and perform normal charge. In operation 1123, the electronic device 101 may transmit a connection request. Next, according to the method defined in the Bluetooth standard, the electronic device 101 and the stylus pen 201 may be connected. In operation 1125, the electronic device 101 may set descriptors.

Figure 12:
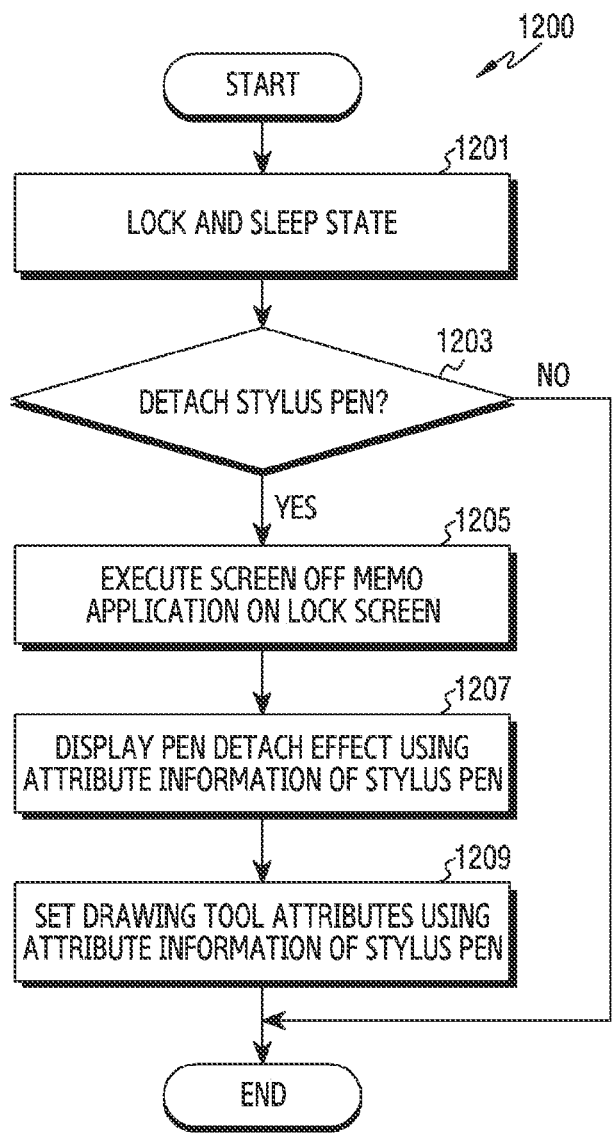
FIG. 12 is a flowchart for processing a proximity input of a stylus pen in an electronic device according to various embodiments of the present invention.
Figure 13:
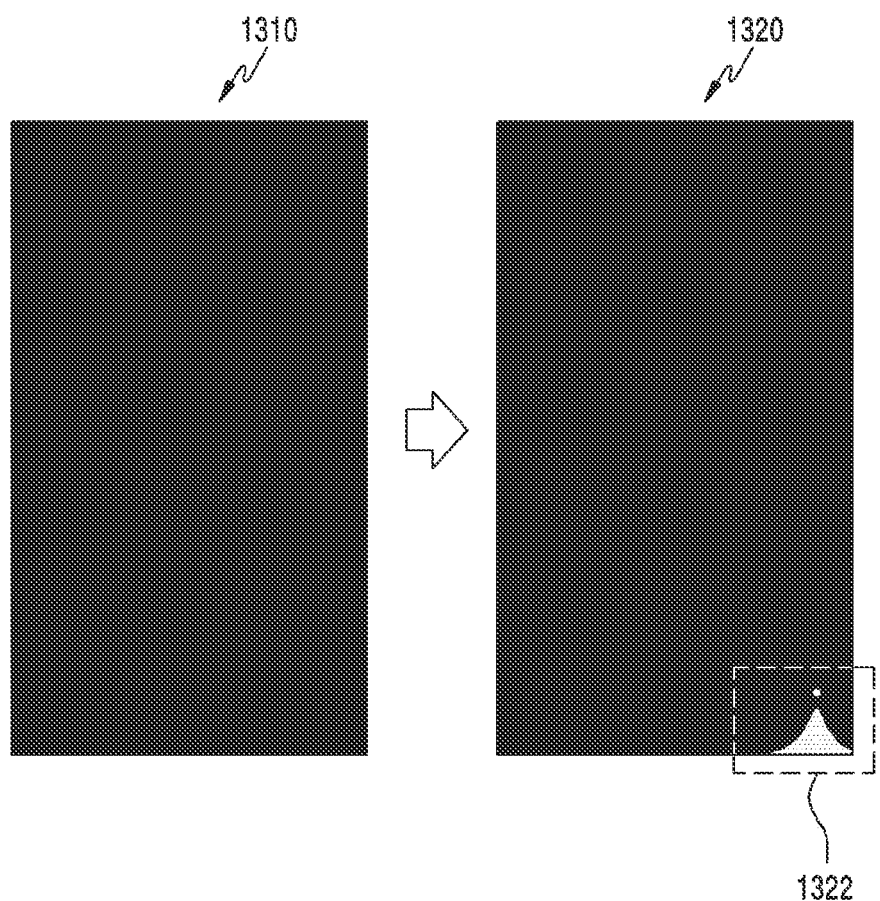
FIG. 13 through FIG. 14 are diagrams illustrating an example of a screen displayed in response to detachment of a stylus pen and an example of a screen displayed in response to a proximity input of the stylus pen in an electronic device according to various embodiments of the present invention.
Figure 14:
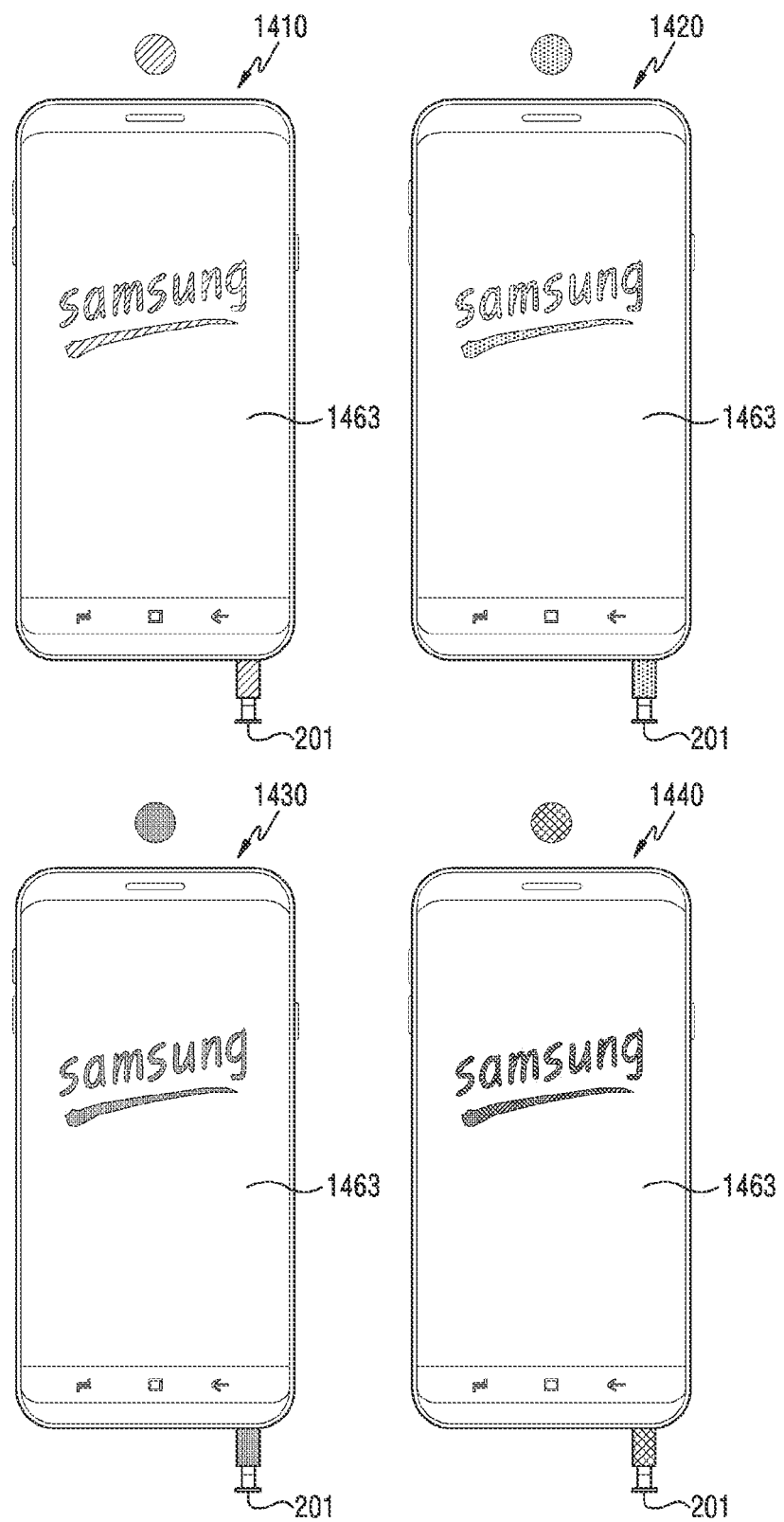

FIG. 12 is a flowchart 1200 for processing a proximity input of a stylus pen in an electronic device according to various embodiments of the present invention. FIG. 13 through FIG. 14 are diagrams illustrating an example of a screen displayed in response to detachment of a stylus pen and an example of a screen displayed in response to a proximity input of a stylus pen if a screen off memo application is executed in an electronic device according to various embodiments of the present invention.

FIG. 12 is a part of operation 803 of FIG. 8, and an operation entity of the flowchart 1200 illustrated may be understood as the electronic device 101 or the component (e.g., the processor 120, the digitizer controller 511) of the electronic device 101.

Referring to FIG. 12, in operation 1201, the electronic device 101 (e.g., the processor 120, the digitizer controller 511) may operate in a lock and sleep state. The lock and sleep state may indicate a state in which a display (e.g., the display device 160) enters an off or power saving state as there is no user input to the electronic device 101 for a specific time.

In operation 1203, the electronic device 101 may determine whether the stylus pen 201 is detaching. The electronic device 101 may detect whether the stylus pen 201 is detached based on a proximity input of a detection coil (e.g., the first wireless charging circuit 540) of the stylus pen 201. According to an embodiment, if the stylus pen 201 is inserted into the hole 111, the electronic device 101 may detect whether the stylus pen 201 is detached using the detection coil 540 which interacts with the resonant circuit 287 of the stylus pen 201. For example, the electronic device 101 may determine whether the stylus pen 201 is detached based on a signal received from the stylus pen 201 in response to applying the resonance signal.

If the stylus pen 201 is detached, in operation 1205, the electronic device 101 may execute the screen off memo application on the lock screen. The screen off memo application may be a memo application for providing a function of inputting a drawing without unlocking. According to an embodiment, upon detecting the detachment of the stylus pen 201 in the sleep state, the electronic device 101 may execute an application (e.g., the screen off memo application) associated with the proximity input of the stylus pen 201 on the lock screen.

In operation 1207, the electronic device 101 may display a pen detach effect on the display 160 using the attribute information of the stylus pen 201. The electronic device 101 may display on the display 160 a visual effect for providing a guide according to the detection of the detachment of the stylus pen 201 in executing the application. For example, a screen as shown in FIG. 13 may be displayed. Referring to FIG. 13, before the stylus pen 201 is detached, if there is no user input, the electronic device 101 may display a first screen 1310 in the lock and sleep state, and display a second screen 1320 according to the detachment detection of the stylus pen 201. A graphic user interface (GUI) 1322 according to the detachment of the stylus pen 201 may be displayed on the display 160 at a lower right side of the second screen 1320. In so doing, the electronic device 101 may determine a color of the GUI 1322 based on the attribute information of the stylus pen 201 previously stored. For example, if the color value 'blue' is stored as the attribute information, the color of the GUI 1322 may be displayed as the color of 'blue'. The shape of the GUI 1322 shown in FIG. 13 is one example, and a GUI of another shape may be displayed on the display 160 according to another embodiment.

In operation 1209, the electronic device 101 may set attributes of a drawing tool using the attribute information of the stylus pen 201. In executing the application associated with the proximity input of the stylus pen 201, a color value of the drawing tool for display corresponding to the proximity input of the stylus pen 201 may be set based on the attribute information of the stylus pen 201. For example, the digitizer controller 511 may detect a proximity signal received from the resonant circuit according to the proximity of the stylus pen 201. The electronic device 101 may display a movement trajectory of a vector type as a drawing output on the display 160 based on the movement of the proximity signal. In displaying the drawing output, the electronic device 101 may determine a color of the drawing output displayed on the display 160 based on the attribute information of the stylus pen 201. For example, according to the attribute information of the stylus pen 201, the color of the drawing output displayed on the display 160 may be variously represented as shown in FIG. 14. Referring to FIG. 14, if a screen off memo application 1463 is executed, drawing outputs displayed on a first screen 1410, a second screen 1420, a third screen 1430, and a fourth screen 1440 may be represented in different colors, according to the proximity input of the stylus pen 201. The different colors may result from the attribute information of the stylus pen 210 stored in the memory 130. According to an embodiment, as shown in the example of FIG. 14, the color used to express the drawing output may be substantially the same as the exterior color of the stylus pen 210.

As in the embodiment described with reference to FIG. 13 and FIG. 14, the drawing output according to the proximity input of the stylus pen 201 may be expressed in a color designated by the attribute information of the stylus pen 201. In some cases, the stylus pen may be replaced during the drawing by the user, and processing of the color applied to the drawing output before and after replacing the stylus pen may be problematic. According to an embodiment, the color of every drawing output may be changed according to the replacement of the stylus pen. According to another embodiment, the color of the drawing output inputted before the stylus pen replacement may be maintained. Hereafter, an embodiment in which the color of the trajectory inputted before the stylus pen replacement is maintained is described.

Figure 15:
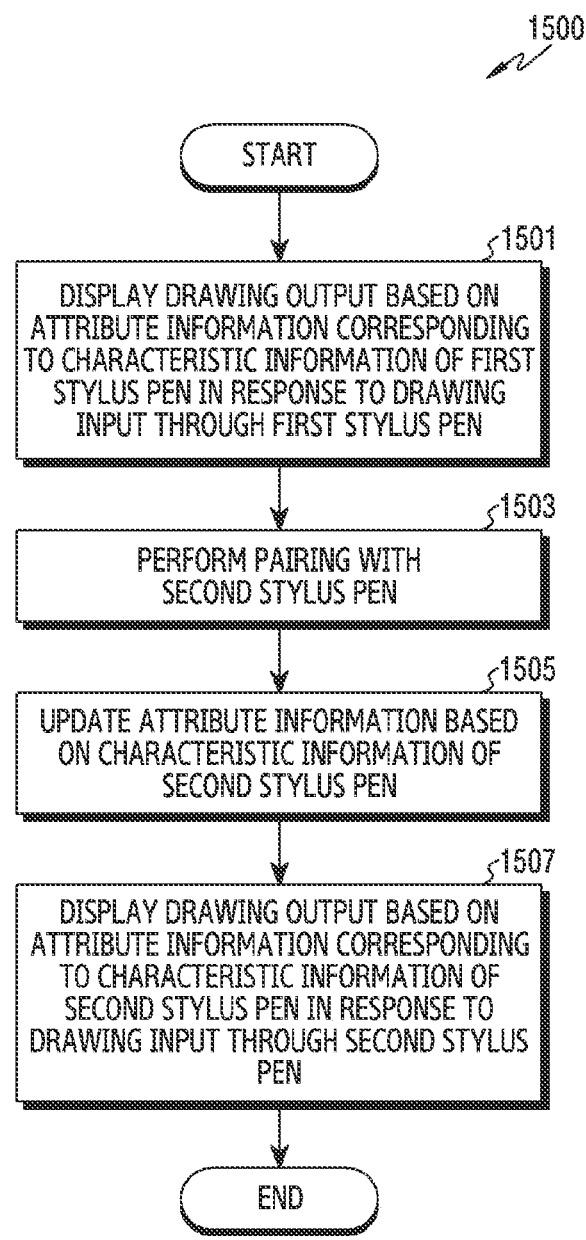
FIG. 15 is a flowchart for processing proximity inputs before and after a change of a stylus pen in an electronic device according to various embodiments of the present invention.
Figure 16:
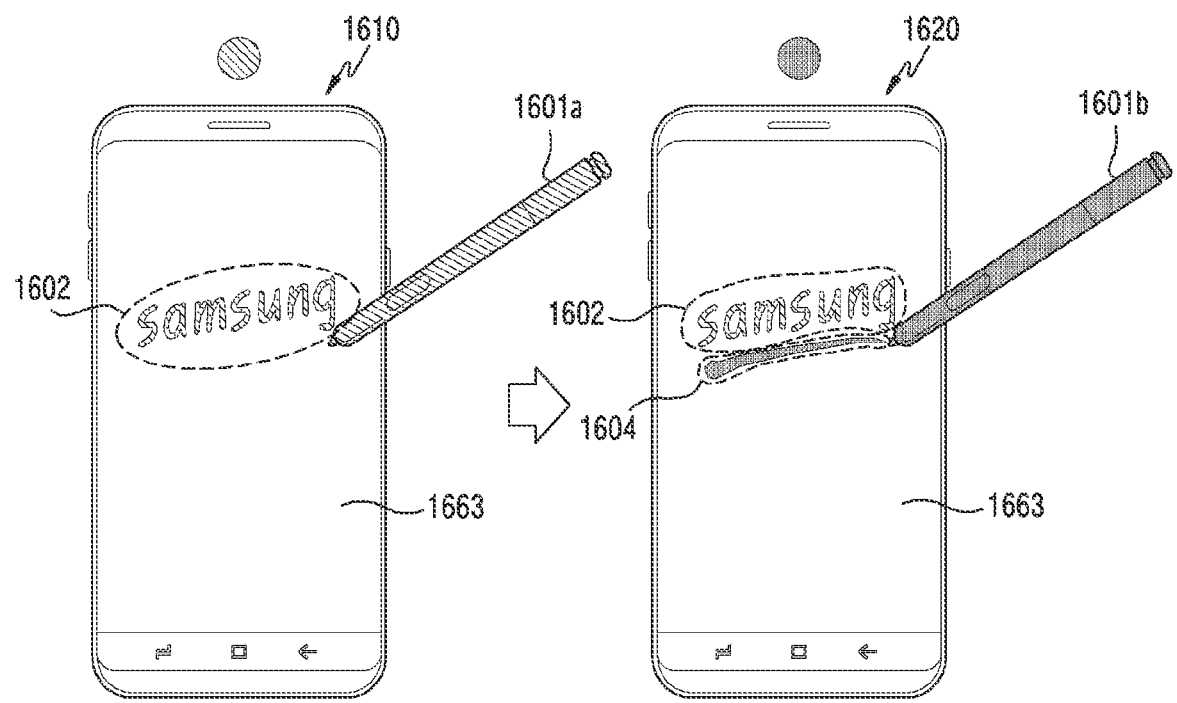
FIG. 16 is a diagram illustrating an example of a screen displayed in response to a proximity input of a plurality of stylus pens in an electronic device according to various embodiments of the present invention.

FIG. 15 is a flowchart 1500 for processing proximity inputs before and after a change of a stylus pen in an electronic device according to various embodiments of the present invention. FIG. 16 is a diagram illustrating an example of a screen displayed in response to proximity inputs of a plurality of stylus pens in an electronic device according to various embodiments of the present invention.

FIG. 15 is part of operation 801 and operation 803 of FIG. 8, and an operating entity of the illustrated flowchart 1500 may be understood as the electronic device 101 or the component (e.g., the processor 120, the digitizer controller 511) of the electronic device 101.

Referring to FIG. 15, in operation 1501, the electronic device 101 (e.g., the processor 120, the digitizer controller 511) may display a drawing output on the screen 160 based on attribute information corresponding to characteristic information of a first stylus pen in response to a drawing input through the first stylus pen. For example, referring to FIG. 16, if a drawing input occurs using a first stylus pen 1601a while a screen off memo application 1663 is executed, a drawing output 1602 may be displayed on the display 160 in a color indicated by the attribute information corresponding to the characteristic information of the first stylus pen 1601a, as shown in a first screen 1610.

In operation 1503, the electronic device 101 may perform the pairing with a second stylus pen. For example, the electronic device 101 may detect that the second stylus pen is inserted into the hole 111, identify the second stylus pen using a charging signal, and then perform the pairing operation. During the pairing operation, the electronic device 101 may obtain characteristic information of the second stylus pen.

In operation 1505, the electronic device 101 may update the attribute information stored in the memory 130 based on the characteristic information of the paired second stylus pen. The electronic device 101 may replace the attribute information of the first stylus pen with the attribute information of the second stylus pen. In response to pairing with the second stylus pen while being paired with the first stylus pen, the electronic device 101 may update the attribute information of the first stylus pen stored in a predefined area on the memory 130 with the attribute information of the second stylus pen. Hence, applications may access the attribute information of the second stylus pen.

In operation 1507, the electronic device 101 may display the drawing output on the display 160 based on the attribute information corresponding to the characteristic information of the second stylus pen in response to the drawing input through the second stylus pen. For example, referring to FIG. 16, after pairing with the second stylus pen 1601b, if a drawing input occurs using a second stylus pen 1601b, the color of the drawing output 1602 by the input using the first stylus pen 1601a may be maintained, and a drawing output 1604 according to an additional input by the second stylus pen 1601b may be represented in a color indicated by attribute information corresponding to the characteristic information of the second stylus pen 1601b, as shown in a second screen 1620.

As in the above-described various embodiments, the color of the drawing output displayed in the screen off memo application may vary according to the characteristic information of the stylus pen 201. In some cases, the user may want to change the color of the drawing output to a color defined as a default value in the electronic device 101. Hence, the electronic device 101 according to an embodiment of the present invention may provide an interface for setting whether to reflect the characteristic information of the stylus pen 201. An embodiment using an interface for setting whether to reflect the characteristic information of the stylus pen 201 in the drawing output is described below.

Figure 17:
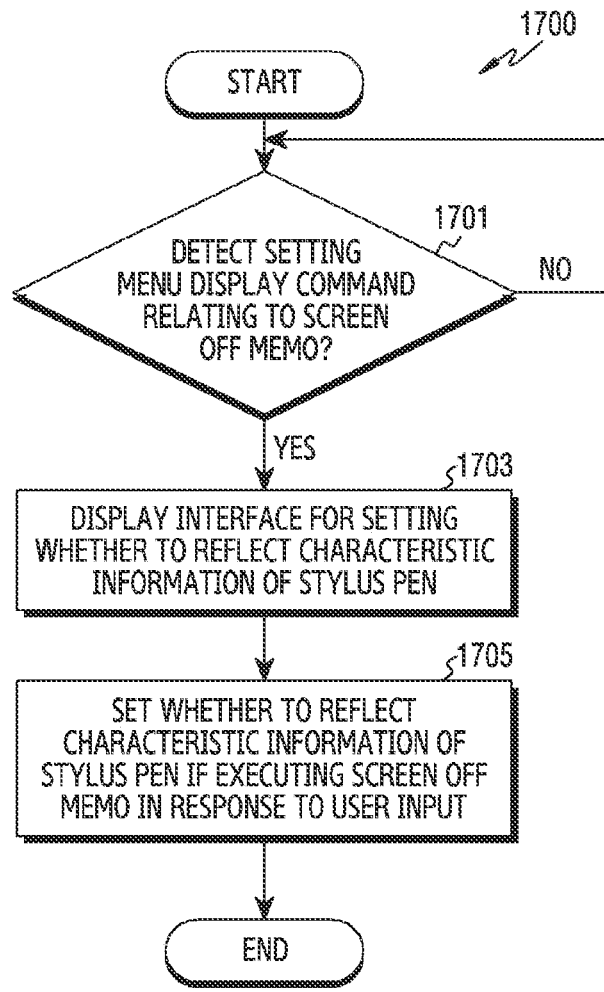
FIG. 17 is a flowchart for changing setting related to a screen off memo application in an electronic device according to various embodiments of the present invention.
Figure 18:
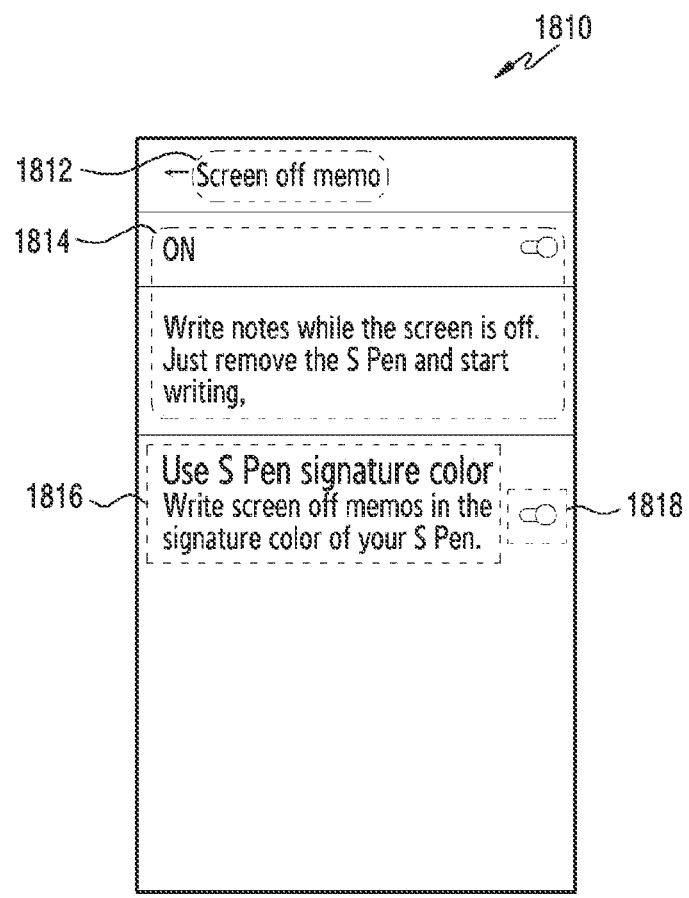
FIG. 18 is a diagram illustrating an example of a screen for a screen off memo application related setting menu in an electronic device according to various embodiments of the present invention.

FIG. 17 is a flowchart 1700 for changing a screen off memo application related setting in an electronic device according to various embodiments of the present invention. FIG. 18 is a diagram illustrating an example of a screen for a screen off memo application related setting menu in an electronic device according to various embodiments of the present invention.

FIG. 17 is part of operation 801 of FIG. 8, and an operating entity of the illustrated flowchart 1700 may be understood as the electronic device 101 or the component (e.g., the processor 120, the digitizer controller 511) of the electronic device 101.

Referring to FIG. 17, in operation 1701, the electronic device 101 (e.g., the processor 120, the digitizer controller 511) may determine whether a setting menu display command relating to the screen off memo application is detected. For example, while displaying the setting menu of the electronic device 101 on the display 160, the user may select a submenu related to the setting of the screen off memo application.

If detecting the setting menu display command related to the screen off memo application, in operation 1703, the electronic device 101 may display an interface for setting whether to reflect the characteristic information of the stylus pen 201 on the display 160. For example, as shown in FIG. 18, an interface 1810 for setting whether to reflect the characteristic information of the stylus pen 201 may include a title phrase 1812 indicating the setting menu for the screen off memo application, items 1814 (e.g., a guide text and an on/off button) for setting whether to activate the screen off memo application, a guide phrase 1816 for displaying an item relating to setting whether to reflect the characteristic information of the stylus pen 201 and an item 1818 (e.g., an on/off button) for inputting a setting of whether to reflect the characteristic information of the stylus pen 201.

In operation 1705, the electronic device 101 may set whether to reflect the characteristic information of the stylus pen 201 if the screen off memo application is executed in response to a user input. If a user's selection result is inputted through the item 1804 included in the interface as shown in FIG. 18, the electronic device 101 may identify the user's selection result, and set a variable value indicating whether to reflect the characteristic information of the stylus pen 201 according to the identified selection result. It setting not to reflect the characteristic information of the stylus pen 201, a predefined attribute information value in the electronic device 101 may be used, if the screen off memo application is executed.

As in the embodiment described with reference to FIG. 17, the user may enable or disable the function for reflecting the characteristic information of the stylus pen 201 in processing the proximity input of the stylus pen 201 through the setting menu which sets whether to reflect the characteristic information of the stylus pen 201. If the user changes the setting, the electronic device 101 may maintain the color of the drawing output created before the change, and the colors of the drawing output changed according to the additional input may be displayed on the screen of the screen off memo application. In addition, if changing the attribute information, the user may selectively control whether to change the attribute information based on the characteristic information of a newly paired stylus pen in re-pairing or not to change. Hereafter, an embodiment for processing the drawing input generated before and after changing the setting of whether to reflect the characteristic information of the stylus pen 201 is described.

Figure 19:
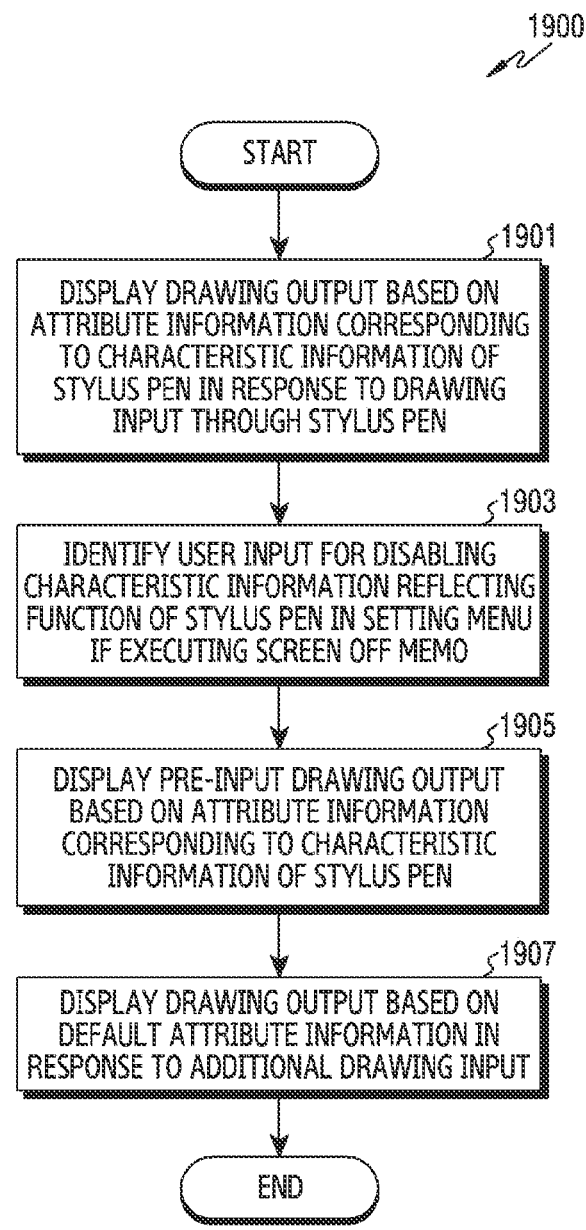
FIG. 19 is a flowchart for processing proximity inputs before and after changing a screen off memo application related setting in an electronic device according to various embodiments of the present invention.
Figure 20:
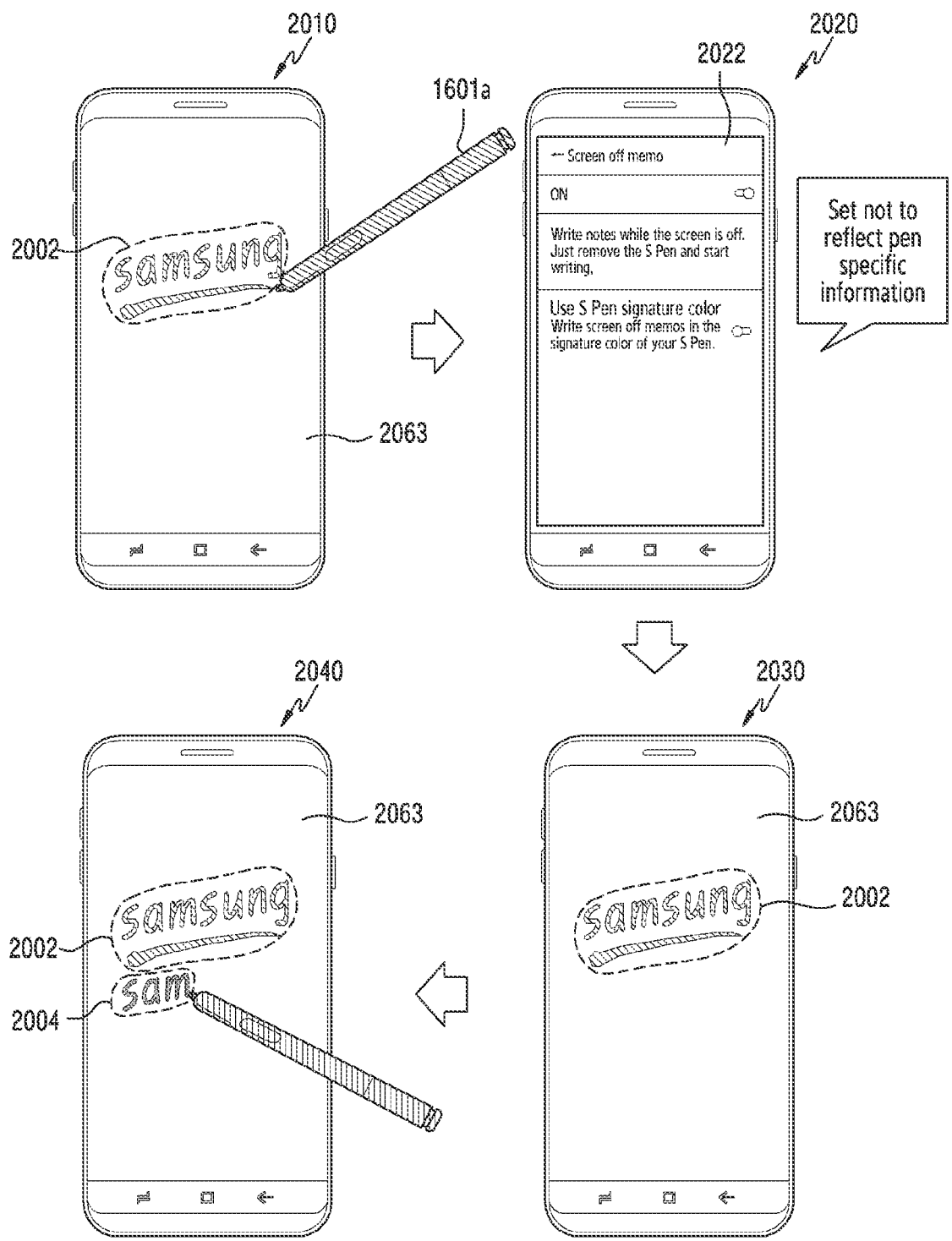
FIG. 20 is a diagram illustrating an example of a screen displayed in response to a proximity input if a screen off memo application related setting is changed in an electronic device according to various embodiments of the present invention.

FIG. 19 is a flowchart 1900 for processing proximity inputs before and after changing a screen off memo application related setting in an electronic device according to various embodiments of the present invention. FIG. 20 is a diagram illustrating an example of a screen displayed in response to a proximity input if a screen off memo application related setting is changed in an electronic device according to various embodiments of the present invention.

FIG. 19 is part of operation 801 and operation 803 of FIG. 8, and an operating entity of the illustrated flowchart 1900 may be understood as the electronic device 101 or the component (e.g., the processor 120, the digitizer controller 511) of the electronic device 101.

Referring to FIG. 19, in operation 1901, the electronic device 101 (e.g., the processor 120, the digitizer controller 511) may, if executing the screen off memo application, display a drawing output on the display 160 based on the attribute information corresponding to the characteristic information of the stylus pen 201 in response to the drawing input through the stylus pen 201. For example, in an execution screen of a screen off memo application 2063, as shown in a first screen 2010 of FIG. 20, a drawing output 2002 may be represented in a color indicated by the attribute information corresponding to the characteristic information of the stylus pen 201.

In operation 1903, the electronic device 101 may identify a user input for disabling the characteristic information reflecting function of the stylus pen 201 in the setting menu if the screen off memo application is executed. The electronic device 101 may set a variable value indicating whether to reflect the characteristic information of the stylus pen 201 to a negative value according to a user's selection. For example, the electronic device 101 may display a setting menu 2022 such as a second screen 2020 of FIG. 20, and identify a user input for disabling the characteristic information reflecting function of the stylus pen 201.

In operation 1905, the electronic device 101 may display a pre-input drawing output on the display 160 based on the attribute information corresponding to the characteristic information of the stylus pen 201. If the setting menu is terminated, the electronic device 101 may display the execution screen of the screen off memo application back on the display 160, and the displayed screen may include the pre-inputted drawing input. The drawing output inputted before the setting change may be represented according to settings at the input. For example, as shown in a third screen 2030 of FIG. 20, after the setting menu 2022 is terminated, the electronic device 101 may display the screen including the pre-inputted drawing output 2002 on the display 160.

In operation 1907, the electronic device 101 may display the drawing output on the display 160 based on the default value of the attribute information in response to an additional drawing input. After the setting is changed, if the additional drawing input occurs, the electronic device 101 may display the drawing output on the display 160 based on the default value of the attribute information, according to the changed setting. For example, as shown in a fourth screen 2040 of FIG. 20, both of the drawing output 2002 represented based on the attribute information corresponding to the characteristic information of the stylus pen 201 and the drawing output 2004 represented based on the default value of the attribute information 2004 may be displayed.

According to various embodiments described above, the attribute information may be determined from the characteristic information stored in the stylus pen 201, and the proximity input of the stylus pen 201 may be processed based on the attribute information. According to an embodiment, the characteristic information stored in the stylus pen 201 may be the color code, and the attribute information may be the color value corresponding to the color code. The color code may be stored during or after the manufacture of the stylus pen 201, and may be determined according to the exterior color of the stylus pen 201. An example of correspondences between the exterior color of the electronic device, the exterior color of the stylus pen, the color code, and the color value is shown in Table 1 below.

TABLE 1

| exterior color of electronic device | exterior color of stylus pen | color code | color value |
|---|---|---|---|
| BLACK | BLACL | ZK | silver |
| BROWN | COPPER | PN | copper |
| PURPLE | LAVANDER | LP | lavender |
| BLUE | YELLOW | YZ | yellow |
| PURPLE | SILVER | AS | purple |
|  | LAVENDER | SP | lavender |
| BLUE | SILVER | BS | blue |
|  | YELLOW | YZ | yellow |
|  | YELLOW | YZ | yellow |
|  | SILVER | BS | blue |
| SILVER | SILVER | VS | sky blue |

Figure 21:
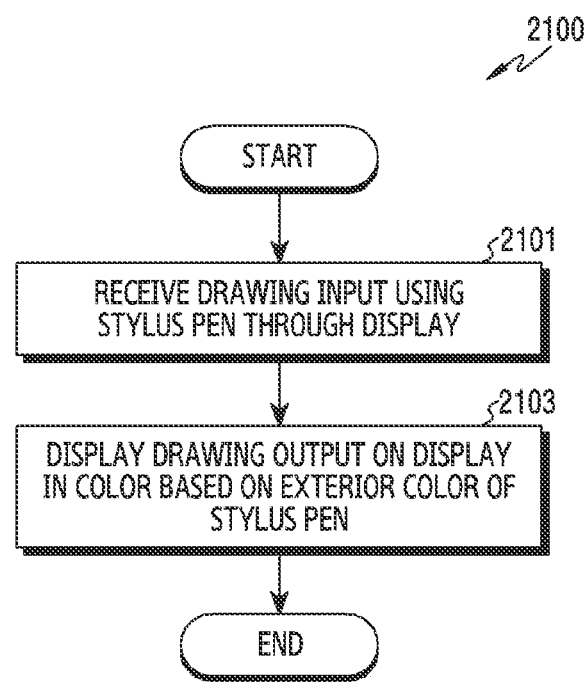
FIG. 21 is another flowchart for processing an input using a stylus pen according to an exterior color of the stylus pen in an electronic device according to various embodiments of the present invention.

FIG. 21 is another flowchart 2100 for processing an input using a stylus pen according to an exterior color of a stylus pen in an electronic device according to various embodiments of the present invention. FIG. 21 is part of operation 803 of FIG. 8, and an operating entity of the illustrated flowchart 2100 may be understood as the electronic device 101 or the component (e.g., the processor 120, the digitizer controller 511) of the electronic device 101.

Referring to FIG. 21, in operation 2101, the electronic device 101 (e.g., the processor 120, the digitizer controller 511) may receive a drawing input using the stylus pen 201 through the display 160. The stylus pen 201 may be inserted into the hole 111 connected to the internal space of the housing 110 of the electronic device 101, and may have an exterior or an external surface including a selected color.

In operation 2103, the electronic device 101 may display the drawing output on the display 160 in a color based on the exterior color of the stylus pen 201. The color of the drawing output may be the selected color applied to the exterior of the stylus pen 201.

Figure 22:
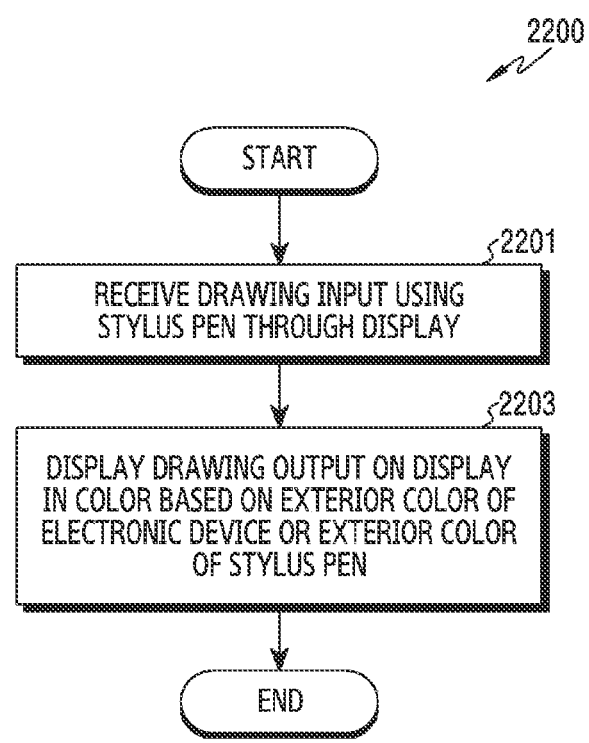
FIG. 22 is yet another flowchart for processing an input using a stylus pen according to an exterior color of an electronic device and an exterior color of the stylus pen in an electronic device according to various embodiments of the present invention.

FIG. 22 is yet another flowchart 2200 for processing an input using a stylus pen according to an exterior color of an electronic device and an exterior color of the stylus pen in the electronic device according to various embodiments of the present invention. FIG. 22 is part of operation 803 of FIG. 8, and an operating entity of the illustrated flowchart 2200 may be understood as the electronic device 101 or the component (e.g., the processor 120, the digitizer controller 511) of the electronic device 101.

Referring to FIG. 22, in operation 2201, the electronic device 101 (e.g., the processor 120, the digitizer controller 511) may receive a drawing input using the stylus pen 201 through the display 160. The housing 110 of the electronic device 101 may have an exterior or an external surface including a first color selected. The stylus pen 201 may be inserted into the hole 111 connected to the internal space of the housing 110 of the electronic device 101, and may have the exterior or the external surface including a second color selected.

In operation 2203, the electronic device 101 may display the drawing output on the display 160 in a color based on the exterior color of the electronic device 101 or the exterior color of the stylus pen 201. The color of the drawing output may be the selected first color applied to the exterior of the housing 1110 of the electronic device 101 or the selected second color applied to the exterior of the stylus pen 201. Based at least in part on the selected first color or the selected second color, the color of the drawing output may be selectively determined.

Figure 23:
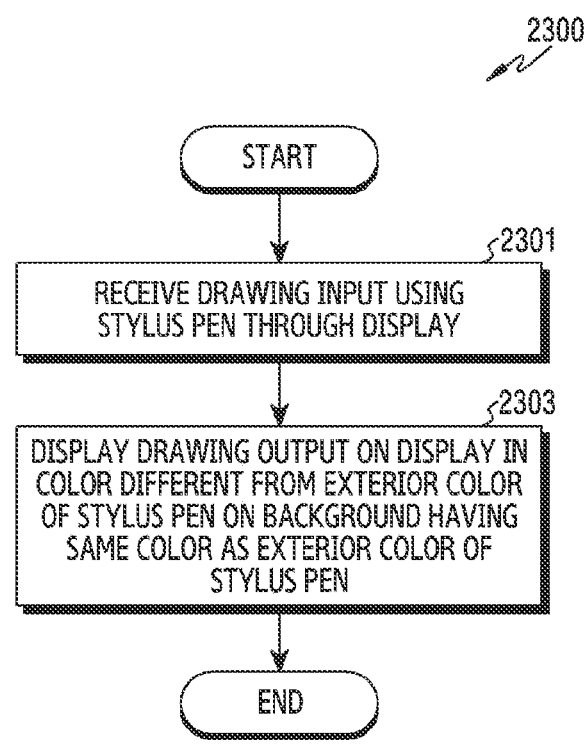
FIG. 23 is still another flowchart for processing an input using a stylus pen according to an exterior color of the stylus pen and a background color of a screen in an electronic device according to various embodiments of the present invention.

FIG. 23 is still another flowchart 2300 for processing an input using a stylus pen according to an exterior color of a stylus pen and a background color of a screen in an electronic device according to various embodiments of the present invention. FIG. 23 is part of operation 803 of FIG. 8, and an operating entity of the illustrated flowchart 2300 may be understood as the electronic device 101 or the component (e.g., the processor 120, the digitizer controller 511) of the electronic device 101.

Referring to FIG. 23, in operation 2301, the electronic device 101 may receive a drawing input using the stylus pen 201 through the display 160. The stylus pen 201 may be inserted into the hole 111 connected to the internal space of the housing 110 of the electronic device 101, and may have the exterior or the external surface including a selected color.

In operation 2303, the electronic device 101 may display the drawing output on the display 160 in a color different from the exterior color of the stylus pen 201 on a background having the same color as the exterior color of the stylus pen 201. The color of the drawing output may be a selected second color, which is different from the selected first color.

According to various embodiments of the present invention, an operating method of an electronic device (e.g., the electronic device 101) may include, detecting insertion of a stylus pen (e.g., the stylus pen 201) into a hole (e.g., the hole 111) formed in a housing (e.g., the housing 110) of the electronic device, pairing with the stylus using a wireless communication circuit, in response to the detection, obtaining information of the stylus pen received during the pairing, and processing an input using the stylus pen based at least in part on the obtained information of the stylus pen.

According to various embodiments of the present invention, the input using the stylus pen may be a drawing input for a memo application executed on a lock screen, and the drawing output displayed on a display in response to the drawing input may be displayed in a color indicated by the stylus pen information.

According to various embodiments of the present invention, the input using the stylus pen may be a drawing input for a memo application executed on a lock screen, and the drawing output displayed on a display in response to the drawing input may be displayed in a shape indicated by the stylus pen information.

In the various embodiments as mentioned above, the characteristic information of the stylus pen 201 is illustrated as the color code, and the attribute information is illustrated as the color value. According to another embodiment, the characteristic information may be defined as a value indicating a type of the stylus pen 201. For example, the type may be based on a material of the exterior of the stylus pen 201, and may indicate metal and plastic separately. In this case, if the drawing is input, a shape of the line may depend on the value indicating the type. For example, if the type value indicating the metal is stored, the line may be designed to give a more sharp impression (e.g., to make the end of the line sharper, to make a boundary of the line and the boundary sharper), compared with the stored type value indicating the plastic.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
   a first stylus pen comprising:
      a pen housing with an external surface having a first color;
      a pen memory disposed inside the pen housing and storing information of the first stylus pen comprising first color information of the first stylus pen; and
      a battery,
   a housing comprising an inner space and a hole connected to the inner space, wherein the first stylus pen is insertable into the inner space through the hole;
   a first wireless charging circuit configured to apply a charging signal for charging the battery of the first stylus pen;
   a wireless communication circuit disposed inside the housing;
   a touch screen display visible through part of the housing;
   a processor disposed inside the housing and operatively coupled with the touch screen display; and
   a memory disposed inside the housing and operatively coupled with the processor;
   wherein the memory stores instructions for, when executed, causing the processor to:
      detect insertion of the first stylus pen into the hole,
      in response to the detection, generate the charging signal for the first stylus pen,
      receive an advertising signal transmitted from the first stylus pen in response to the charging signal, wherein the advertising signal contains the information of the first stylus pen comprising the first color information,
      receive a first drawing input using the first stylus pen through the display after the first stylus pen has been removed from the hole,
      in response to the first drawing input, display the first drawing output on the display, and
      set a color of the first drawing output to the first color determined based on the received first color information.

2. The electronic device of claim 1, wherein the instructions cause the processor to:
   store the first color information in the memory,
   wherein the first color information is stored in a predefined area of the memory.

3. The electronic device of claim 1, wherein the memory stores an application program related to an input using the first stylus pen, and
the instructions cause the processor to:
based on the first color information of the first stylus pen, provide a user interface of the application program which sets whether to determine the color of the first stylus pen input on the display.

4. The electronic device of claim 1, wherein the wireless communication circuit is configured to support a Bluetooth standard or Bluetooth low energy (BLE).

5. The electronic device of claim 1, wherein the instructions cause the processor to,
after displaying the first drawing output on the display, receive a second drawing input using a second stylus pen having an external surface comprising a second color which is different from the first color,
in response to the second drawing input, display the second drawing output, while maintaining the first drawing output on the display, and
make a color of the second drawing output different from the color of the first drawing output.

6. The electronic device of claim 1, wherein the instructions cause the processor to,
display an interface for controlling a function which sets the color of the first drawing output as the first color on the display, and
enable or disable the function which sets the color of the first drawing output as the first color based on a user input inputted through the interface.

7. The electronic device of claim 1, wherein the external surface of the housing comprises a selected third color, and the instructions cause the processor to,
if the first color is the same as a default color for displaying the first drawing output, set the color of the first drawing output to the third color.

8. The electronic device of claim 7, wherein the color of the first drawing output is set to a fourth color which is different from the first color and the third color, if the first color and the third color are the same as the default color for displaying the first drawing output.

9. The electronic device of claim 1, wherein the instructions cause the processor to,
display a user interface having a background of the first color on the display,
receive the first drawing input using the first stylus pen through the user interface,
and
set the color of the first drawing output to a fifth color which is different from the first color.

10. The electronic device of claim 9, wherein the first color is black, and the fifth color is white or silver.

11. An operating method of an electronic device, wherein the operating method comprises following steps performed by a processor the electronic device:
detecting insertion of a first stylus pen into a hole of a housing of the electronic device, wherein the first stylus pen comprises a pen housing with an external surface having a first color;
in response to the detection, generating a charging signal for charging a battery of the first stylus pen;
receiving an advertising signal transmitted from the first stylus pen in response to the charging signal, wherein the advertising signal contains information of the first stylus pen comprising first color information;
receiving a first drawing input using the first stylus pen through a display of the electronic device, after the first stylus pen has been removed from the hole; and
in response to the first drawing input, displaying the first drawing output on the display;
setting a color of the first drawing output to the first color determined based on the received first color information.

\* \* \* \* \*